United States Patent
Masel et al.

(10) Patent No.: US 7,132,188 B2
(45) Date of Patent: Nov. 7, 2006

(54) FUEL CELLS AND FUEL CELL CATALYSTS

(75) Inventors: Richard I. Masel, Champaign, IL (US);
Cynthia A. Rice, Newington, CT (US);
Piotr Waszczuk, White Bear Lake, MN
(US); Andrzej Wieckowski,
Champaign, IL (US)

(73) Assignee: **The Board of Trustees of the
University of Illinois**, Urbana, IL (US)

(*) Notice: Subject to any disclaimer, the term of this patent is extended or adjusted under 35 U.S.C. 154(b) by 206 days.

(21) Appl. No.: 10/407,385

(22) Filed: Apr. 4, 2003

(65) Prior Publication Data
US 2003/0198852 A1   Oct. 23, 2003

Related U.S. Application Data

(60) Provisional application No. 60/369,992, filed on Apr. 4, 2002.

(51) Int. Cl.
*H01M 8/10* (2006.01)
*H01M 4/90* (2006.01)
*H01M 4/92* (2006.01)

(52) U.S. Cl. .................... 429/30; 429/15; 429/33; 429/34; 429/44; 429/46

(58) Field of Classification Search .............. 429/15, 429/46, 30, 33, 34, 44
See application file for complete search history.

(56) References Cited

U.S. PATENT DOCUMENTS

| | | | |
|---|---|---|---|
| 3,198,666 A | 8/1965 | Gruneberg et al. | |
| 3,297,487 A * | 1/1967 | Pomeroy et al. | 429/41 |
| 3,506,494 A | 4/1970 | Adlhart | 429/13 |
| 3,711,385 A | 1/1973 | Beer | 205/465 |
| 4,039,409 A | 8/1977 | LaConti et al. | 205/631 |
| 4,081,409 A | 3/1978 | McNicol et al. | 502/332 |
| 4,127,468 A | 11/1978 | Alfenaar et al. | 204/284 |
| 4,431,750 A | 2/1984 | McGinnis et al. | 502/329 |
| 4,447,506 A | 5/1984 | Luczak et al. | 429/44 |
| 4,457,823 A | 7/1984 | LaConti et al. | 204/282 |
| 4,457,986 A | 7/1984 | Bindra et al. | 429/40 |
| 4,478,917 A | 10/1984 | Fujita et al. | 429/33 |
| 4,493,878 A | 1/1985 | Horiba et al. | 429/12 |
| 4,797,380 A | 1/1989 | Motoo et al. | 502/159 |
| 4,806,515 A | 2/1989 | Luczak et al. | 502/185 |
| 4,822,699 A | 4/1989 | Wan | 429/40 |
| 5,004,424 A | 4/1991 | Larminie | 434/301 |

(Continued)

FOREIGN PATENT DOCUMENTS

JP            01227361 A        3/1988

OTHER PUBLICATIONS

Guo-Qiang Lu, Alechia Crown, and Andrzej Wieckowski, "Formic Acid Decomposition on Polycrystalline Platinum and Palladized Platinum Electrodes," J. Phys. Chem. B 1999, 103, pp. 9700-9711.

(Continued)

*Primary Examiner*—Hoa Van Le
(74) *Attorney, Agent, or Firm*—Greer, Burns & Crain, Ltd.

(57) ABSTRACT

A direct organic fuel cell includes a formic acid fuel solution having between about 10% and about 95% formic acid. The formic acid is oxidized at an anode. The anode may include a Pt/Pd catalyst that promotes the direct oxidation of the formic acid via a direct reaction path that does not include formation of a CO intermediate.

37 Claims, 10 Drawing Sheets

U.S. PATENT DOCUMENTS

| | | | |
|---|---|---|---|
| 5,024,905 A | 6/1991 | Itoh et al. | 429/44 |
| 5,096,866 A | 3/1992 | Itoh et al. | 429/40 |
| 5,183,713 A | 2/1993 | Kunz | 429/44 |
| 5,208,207 A | 5/1993 | Stonehart et al. | 502/339 |
| 5,225,391 A | 7/1993 | Stonehart et al. | 502/324 |
| 5,246,791 A | 9/1993 | Fisher et al. | 429/46 |
| 5,364,711 A | 11/1994 | Yamada et al. | 429/15 |
| 5,393,619 A | 2/1995 | Mayer et al. | 429/152 |
| 5,599,638 A | 2/1997 | Surampudi et al. | 429/33 |
| 5,773,162 A | 6/1998 | Surampudi et al. | 429/39 |
| 5,856,036 A | 1/1999 | Smotkin et al. | 429/40 |
| 5,904,740 A * | 5/1999 | Davis | 44/385 |
| 6,007,934 A | 12/1999 | Auer et al. | 429/44 |
| 6,020,083 A | 2/2000 | Breault et al. | 429/36 |
| 6,146,782 A | 11/2000 | Wendt et al. | 429/42 |
| 6,165,635 A | 12/2000 | Auer et al. | 429/40 |
| 6,248,460 B1 | 6/2001 | Surampudi et al. | 429/15 |
| 6,284,402 B1 | 9/2001 | Mallouk et al. | 429/40 |
| 6,326,098 B1 | 12/2001 | Itoh et al. | 429/40 |
| 6,387,557 B1 | 5/2002 | Krasij et al. | 429/32 |
| 6,432,284 B1 | 8/2002 | Narayanan et al. | 204/263 |
| 6,447,941 B1 | 9/2002 | Tomimatsu et al. | 429/26 |
| 6,458,479 B1 | 10/2002 | Ren et al. | 429/33 |
| 6,492,047 B1 * | 12/2002 | Peled et al. | 429/30 |
| 6,492,052 B1 | 12/2002 | Ren | 429/33 |
| 6,495,278 B1 | 12/2002 | Schmid et al. | 429/30 |
| 6,498,121 B1 | 12/2002 | Gorer | 502/325 |
| 6,517,965 B1 | 2/2003 | Gorer | 429/40 |
| 6,649,300 B1 | 11/2003 | Ito et al. | 429/44 |
| 6,660,680 B1 | 12/2003 | Hampden-Smith et al. | 502/180 |
| 6,670,301 B1 * | 12/2003 | Adzic et al. | 502/185 |
| 6,686,308 B1 | 2/2004 | Mao et al. | 502/180 |
| 6,723,678 B1 | 4/2004 | Gorer | 502/326 |
| 6,770,394 B1 * | 8/2004 | Appleby et al. | 429/34 |
| 2004/0115518 A1 | 6/2004 | Masel et al. | 429/46 |

OTHER PUBLICATIONS

Weber, M.; Wang, J.T.; Wasmus, S; Savinell, R.F.; "Formic Acid Oxidation in a Polymer Electrolyte Fuel Cell: A Real-Time Mass-Spectrometry Study," J. Electochem. Soc., 1996, 143(7), L158-I160.

P. Waszczuk, J. Solla-Gullón, H.S. Kim, Y.Y. Tong, V. Montiel, A. Aldaz, and A. Wieckowski, "Methanol Electrooxidation on Platinum/Ruthenium Nanoparticle Catalysts," Journal of Catalysis 203, pp. 1-6 (2001).

Gdowski, G.E.; Fai, J.A.; Maxid, R.J.; Reactive Scattering of Small Molecules from Platinum Crystal Surfaces: $D_2CO$, $CH_3$, $CH_3OH$, HCOOH and the Nonanomalous Kinetics of Hydrogen Atom Recombination, Surf. Sci., 1983, 127(3) 541-54.

M. Watanabe, "Electrocatalysis by Ad-Atoms, Part XIII. Preparation of Ad-Electrodes with Tin Ad-Atoms for Methanol, Formaldehyde and Formic Acid Fuel Cells", J. Electroanal. Chem, 191, Dec. 1985, p. 367-375.

M. Watanbe, "Electrocatatysis By Ad-Atoms, Part XXIII. Design of Platinum Ad-Electrodes for Formic Acid Fuel Cells with Ad-Atoms of the IVth and Vth Groups," J. Electroanal. Chem, 250, Feb. 1988, p. 117-125.

Papageorgopoulos, D. et al.; "CO Tolerance of Pd Rich Platinum Paladium Carbon Supported Electrocatalysts froPEMFC Applications", Journal of the Electrochemical Society, in press, Aug. 2002, pp. 1-22.

Adzic, R. et al.: "Structural Effects in Electrocatalysis", J. Electroanal. Chem., 1983, pp. 79-88.

Avramov-Ivic, M. et al.; "The electrocatalytic properties of the oxides of noble metals in the electrooxidaton of methanol and formic acid", Electrochimica Acta, 2001, pp. 3175-3180.

Baldauf, M. et al., "Formic Acid Oxidation on Ultrathin Pd Films on Au(hkl) and Pt(hkl) Electrodes", J. Phys. Chem., 1996, pp. 11375-11381.

Becerik, I. et al.; "Electro-oxidation of Formic Acid on Highly Dispersed Platinum and Perchlorate Doped Polypyrrole Electrodes", Journal of The Electrochemical Society, 2001, pp. D49-D54.

Capon, A. et al.; "The Effect of Strong Acid on the Reactions of Hydrogen And Oxygen on the Noble Metals a Study Using Cyclic Voltammetry and a New Teflon Electrode Holder", Electroanalytical Chemistry and Interfacial Electrochemistry, 1972, pp. 275-286.

Capon, A. et al., "The Oxidation of Formic Acid on Noble Metal Electrodes II. A Comparison Of the Behaviour of Pure Electrodes", Electroanalytical Chemistry and Interfacial Electrochemistry, 1973, pp. 239-252.

Capon, A. et al.; "The Oxidation of Formic Acid on Noble Metal Electrodes III. Intermediates and Mechanism on Platinum Electrodes", Electroanalytical Chemistry and Interfacial Electrochemistry, 1973, pp. 205-231.

Capon, A. et al.; "The Oxidation of Formic Acid on Noble Metal Electrodes IV. Platinum and Palladium Electrodes", Electroanalytical Chemistry and Interfacial Electrochemistry, 1975, pp. 285-305.

Chi, N. et al.; "Electrocatalytic oxidation of formic acid by Pt/Co nanoparticles", Catalysis Letters vol. 71, No. 1-2, 2001, pp. 21-26.

Clavilier, J. et al.; "Heterogeneous electrocatalysis on well defined platinum surfaces modified by controlled amounts of irreversibly absorbed adatoms", J. Electroanal. Chem., 1989, pp. 89-100.

Climent, V. et al.; "Electrocatalysis of formic acid and CO oxidation on antimony-modified Pt(111) electrodes", Electrochimica. Chemistry, 1993, pp. 1403-1414.

El-Shafei, A. et al.; "Electrocatalytic oxidation of formic acid on Pt binary and ternary electrodes in $H_3PO_4$", Journal of Electroanalytical Chemistry, 1993, pp. 159-165.

El-Shafei, A.; "Study of nickle upd at a polycrystalline Pt electrode and its influence on HCOOH oxidation in acidic and nearly neutral-media", Journal of electroanalytical Chemistry, 1998, pp. 81-89.

Fernandez-Vega, A. et al.; "Heterogeneous electrocatalysis on well defined platinum surfaces modified by controlled amounts of irreversibly absorbed adatoms", J. Electroanal. Chem., 1989, pp. 101-113.

Gonzalez, M.J. et al.; "Electrocatalytic Oxidation of Small Carbohydrate Fuels at Pt-Sn Modified Electrodes", J. Phys. Chem. 1998, pp. 9881-9890.

Ha, S. et al.; "A miniature air breathing direct formic acid fuel cell", Journal of Power Sources, 2004, pp. 119-124.

Ha, S. et al.; "Methanol conditioning for improved performance of formic acid fuel cells", Journal of Power Sources, 2002, pp. 655-659.

Harmsen, J. et al.; "Kinetic modeling for wet air oxidation of formic acid on a carbon supported platinum catalyst", Applied Catalysis, 1997, pp. 499-509.

Hartung, T. et al.; "Catalytic Effect of Hg an Ti Submonolayers on the Electrooxidation of Formic Acid on Pt", J. Electroanal. Chem., 1986, pp. 135-149.

Herrero, E. et al.; "Oxidation of formic acid on Pt(111) electrodes modified by irreversibly absorbed tellurium", Journal of Electroanalytical Chemistry, 1995, pp. 161-167.

Herrero, E. et al.; "Oxidation of formic acid on Pt(100) electrodes modified by irreversibly absorbed tellurium", Journal of Electroanalytical Chemistry, 1995, pp. 145-154.

Jiang, J. et al.; "Nanostructured platinum as an electrocatalyst for the electrooxidation of formic acid", Journal of Electroanalytical Chemistry, 2002, pp. 64-70.

Beden, B. et al.; "Electrocatalytic Activity of Noble Metals for the Oxidation of Formate in Neutral Medium", J. Electroanal. Chem., 1979, pp. 127-131.

Llorca, M. et al.; "Formic acid oxidation on $Pd_{ad}$ +Pt(100) and $PD_{ad}$ + Pt(111) electrodes", Journal of Electroanalytical Chemistry, 1994, pp. 151-160.

Llorca, M. et al.; "Formic acid oxidation on Pt(111) electrodes modified by irreversibly absorbed selenium", Journal of electroanalytical Chemistry, 1994, pp. 217-225.

McGovern, M. et al.; "Effects of Nation as binding agent for unsupported nanoparticle catalysts", Journal of Power Sources, 2003, pp. 35-39.

Shen, P. et al.; "Performance of CO-electrodeposited Pt-Ru/WO$_3$ electrodes for the electrooxidation of formic acid at room temperature", *Journal of Electroanalytical Chemistry*, 1995, pp. 223-225.

Waszczuk, P. et al.; "A nanoparticle catalyst with superior activity for electrooxidation of formic acid", *Electrochemistry Communications*, 2002, pp. 599-603.

Rhee, Y. et al.; "Crossover of formic acid through Nation® membranes", *Journal of Power Sources*, 2003, pp. 35-38.

Pro'kin, S. et al.; "Nanoparticle of Pt hydrosol immobilized on Au support: an approach to the study of structural effects in electrocatalysis", *Electrochimica Acta*, 2001, pp. 2343-4351

Rice, C. et al.; "Catalysts for direct formic acid fuel cells", *Journal of Power Sources*, 2003, pp. 229-235.

Rice, C. et al.; "Direct formic acid fuel cells", *Journal of Power Sources*, 2002, pp. 83-89.

Gasteiger, H. et al.; "Electro-Oxidation of Small Organic Molecules on Well-Characterized Pt-Ru Alloys", *Electrochimica Acta*, vol. 39, No. 11/12, 1994, pp. 1825-1832.

Smith, S. et al.; "Structural effects on the oxidation of HCOOH by bismuth modified Pt(111) electrodes with (110) manatomic steps", *Journal of Electroanalytical Chemistry*, 1999, pp. 43-49.

Shibata, M. et al.; "Electrocatalysis by Ad-Atoms", *J. Electroanal Chem.*, 1988, pp. 253-264.

Chen, M. et al.; "Enhancement of the electrochemical oxidation of formic acid. Effects of anion absorption and variation of rotation rate", *Electrochimica Acta*, 2001, pp. 3481-3492.

Beltowska-Brzezinska M. et al.; "The Influence of Upd-Lead on the Absorption of Formaldehyde, Formic Acid and Methanol on Pt In Acid Solution", *Electrochimica Acta*, vol. 30, No. 11, 1985, pp. 1465-1471.

Xia, X.; "New insights into the influence of upd Sn on the oxidation of formic acid on platinum in acidic solution", *Electrochimica Acta*, 1999, pp. 1057-1066.

Xiang, J. et al.; "Investigation of the mechanism of the electrochemical oxidation of formic acid at a gold electrode in sulfuric acid solution", *Journal of Electroanalytical Chemistry*, 2001, pp. 95-100.

Yang, Y. et al.; "Surface modification and electrocatalytic properties of Pt(100), Pt(110), Pt(320) an Pt(331) electrodes with Sb towards HCOOH oxidation", *Electrochimica Acta*, 2001, pp. 4339-4348.

Sobkowski, J. et al.; "The Behaviour of Formic Acid on a Rhodium Electrode", *J. Electroanal. Chem.*, 1978, pp. 309-320.

Zhang, X. et al.; "Electrocatalytic Oxidation of Formic Acid on Ultrafine Palladium Particles Supported on a Glassy Carbon", *Electrochimica Acta*, vol. 40, No. 12, 1995, pp. 1889-1897.

M. Watanabe, "Electrocatalysis By Ad-Atoms, Part XIII. Preparation of Ad-Electrodes with Tin Ad-Atoms for Methanol Formaldehyde and Formic Acid Fuel Cells", J. Electroanal. Chem. 191, Dec. 1985, p. 367-375.

M. Watanabe, "Electrocatalysis By Ad-Atoms, Part XXIII. Design of Platinum Ad-Electrodes for Formic Acid Fuel Cells with Ad-Atoms of the IVth and the Vth Groups," J. Electroanal. Chem. 250, Feb. 1988, p. 117-125.

Zhu, Y. et al.; "High power density direct formic acid fuel cells", *Journal of Power Sources*, 2004, pp. 8-14.

A. Wieckowski and R. I. Masel,. "UHV and electrochemical studies of CO and methanol adsorbed at platinum/ruthenium surfaces and reference to fuel cell catalysis," Electrochimica Acta 47, 22-23, 3637-3652 (2002).

N. Markovic, H. Gasteiger, P. Ross, X. Jiang, I. Villegas and M. Weaver, "Electro-oxidation mechanisms of methanol and formic acid on Pt-Ru alloy surfaces," Electrochimica Acta, 40, 91-98, (1995).

M. Arenz, V. Stamenkovic, T. J. Schmidt, K. Wandelt, P. N. Ross and N. M. Markovic, "The electro-oxidation of formic acid on Pt PD single crystal bimetallic surfaces," Physical Chemistry Chemical Physics, 5, 4242, (2003).

N. Watanabe, K. Iwatsu, A. Yamakata, T. Ohtani, J. Kubota, J. N. Kondo, A. Wada, K. Domen and C. Hirose, "SFG study of formic acid on a Pt(110)-(1×2) surface," Surf. Sci., 651, 357-358, (1996).

S. W. Jorgensen and R. J. Madix,, "Active oxygen on Group VIII metals: activation of formic acid and formaldehyde on Pd(100)," J. Am. Chem. Soc., 110, 397, (1988).

F. Solymosi and I. Kovacs, "Adsorption and reaction of HCOOH on K-promoted Pd(100) surfaces," Surf. Sci., 259, 95, (1991).

C. Xu and D. W. Goodman, "Adsorption and Reaction of Formic Acid on a Pseudomorphic Palladium Monolayer on Mo(110)," J. Phys. Chem., 100, 245, (1996).

M. Avramov-Ivic, S. Strbac and V. Mitrovic, "The electrocatalytic properties of the oxides of noble metals in the electrooxidation of methanol and formic acid," Electrochimica Acta 46, 3175-3180 (2001).

D. C. Papageorgopoulos, et al. "CO Tolerance of Pd-Rich Platinum Palladium Carbon-Supported Electrocatalysts," Journal of The Electrochemical Society, 149 (11) A1400-A1404 (2002).

B. Beden, C. Lamy and J. M. Leger, "Electrocatalytic Activity of Noble Metals for the Oxidation of Formate In Neutral Medium," Electroanal. Chem, 101, 127-131 (1979).

R. R. Adzic, A.V. Tripkovic and N. M. Markovic, "Structural Effects in Electrocatalysis, Oxidation of Formic Acid and Oxygen Reduction on Single-Crystal Electrodes and the effecst of Foreign Metal Adatoms," Electroanal. Chem., 150 79-88, (1983).

* cited by examiner

FUEL CELLS AND FUEL CELL CATALYSTS

PRIORITY CLAIM

This application claims priority of U.S. Provisional Application Serial No. 60/369,992, filed Apr. 4, 2002.

STATEMENT OF GOVERNMENT INTEREST

This invention was made with Government assistance under Department of Energy Grant No. DEGF-02-99ER14993. The Government has certain rights in the invention.

FIELD OF THE INVENTION

The invention generally relates to fuel cells and catalysts for fuel cells.

BACKGROUND OF THE INVENTION

Fuel cells are electrochemical cells in which a free energy change resulting from a fuel oxidation reaction is converted into electrical energy. Applications for fuel cells include battery replacement, mini and microelectronics, car engines, power plants, and many others. One advantage of fuel cells is that they are substantially pollution-free.

In hydrogen fuel cells, hydrogen gas is oxidized to form water, with a useful electrical current produced as a byproduct of the oxidation reaction. A solid polymer membrane electrolyte layer may be used to separate the hydrogen fuel from the oxygen. The anode and cathode are arranged on opposite faces of the membrane. Electron flow between the anode and cathode layers of the membrane electrode assembly may be exploited to provide electrical power. Hydrogen fuel cells are impractical for many applications, however, because of difficulties related to storing and handling hydrogen gas.

Organic fuel cells may prove useful in many applications as an alternative to hydrogen fuel cells. In an organic fuel cell, an organic fuel such as methanol is oxidized to carbon dioxide at an anode, while air or oxygen is simultaneously reduced to water at a cathode. One advantage over hydrogen fuel cells is that organic/air fuel cells may be operated with a liquid organic fuel. This eliminates problems associated with hydrogen gas handling and storage. Some organic fuel cells require initial conversion of the organic fuel to hydrogen gas by a reformer. These are referred to as "indirect" fuel cells. The need for a reformer increases cell size, cost, complexity, and start up time. Other types of organic fuel cells, called "direct," eliminate these disadvantages by directly oxidizing the organic fuel without conversion to hydrogen gas. To date direct organic fuel cell development has focused on the use of methanol and other alcohols as fuel.

Conventional direct methanol fuel cells have unresolved problems associated with them. For example, methanol and other alcohols have high osmotic and diffusion crossover rates across commercial polymer membrane electrode assemblies. Fuel that crosses over avoids reaction at the anode, and thus cannot be exploited for electrical energy. This limits cell efficiency. An additional problem related to crossover is poisoning of the anode. As methanol or another alcohol fuel crosses over the polymer membrane to the cathode side, it adsorbs onto the cathode catalyst and thereby blocks reaction sites. Efficiency of the cell is thereby reduced. A proposed solution to this problem has been to provide additional catalyst. This adds expense, however, particularly when considering that costly precious and semi-precious metal catalysts such as platinum are often employed.

Because of this high crossover, methanol and other alcohol fuel cells typically operate with a fuel concentration of no more than about 3–8%. The use of those dilute solutions creates additional problems, however. This low fuel concentration requires relatively large amounts of ultra-pure water, typically provided through recycling systems including pumps and filters. Also, the concentration of the fuel needs to be closely monitored and controlled, with the result that sensors and controllers may be required. All of this peripheral equipment adds cost, complexity, weight, and size to direct organic fuel cells.

In addition, this required peripheral water management equipment substantially limits the usefulness of direct methanol fuel cells for applications where size and weight become critical. For portable, miniature, and microelectronics applications, for example, the size, weight, and complexity of the required peripheral equipment makes use of direct methanol fuel cells impractical.

Further, the dilute solutions freeze and expand at temperatures potentially encountered in many fuel cell applications, with portable devices for use outside as an example. The expansion can lead to device failure. Conduit et al. U.S. Pat. No. 6,528,194 teaches that the freezing can be avoided by circulating heated fluid through the fuel tank when the fuel cell is not operating. However, that wastes power and adds complexity.

Still other problems with existing direct methanol fuel cells relate to the electro-oxidation reaction promoted by the anode. For example, an intermediate produced during the oxidation/reduction reaction from the methanol in many direct methanol fuel cells is poisonous carbon monoxide gas. Thus hazards are presented. Also, CO is known to poison catalysts such as Pt and to thereby decrease cell efficiency.

These and other problems remain unresolved in the art.

SUMMARY OF THE INVENTION

An embodiment of the present invention is directed to a direct organic fuel cell that includes an anode linked to a cathode, an anode enclosure, and a cathode enclosure. The fuel cell further includes a liquid fuel solution containing at least 10% by weight of an organic fuel. In a preferred embodiment of the present invention, the organic fuel is formic acid and an anode catalyst is present that includes Pt and Pd.

Another invention embodiment is directed to a membrane electrode assembly that includes a solid polymer electrolyte with an anode on one surface and a cathode on a second surface. The anode is configured to promote the direct decomposition of an organic fuel without the formation of a CO intermediate.

An additional invention embodiment is directed to a method for making an anode catalyst, and includes steps of preparing a suspension of nanoparticles, applying the suspension to a support, drying the suspension to form a thin film on the support, and immersing the support in a metallic solution to spontaneously deposit metal islands on the Pt nanoparticles.

An additional invention embodiment is directed to an anode catalyst for use with a direct formic acid fuel cell. An exemplary anode catalyst comprises metal nanoparticles that have at least a second metal coated thereon, the catalyst being operative to promote the dehydrogenation of formic acid to $CO_2$ and $H^+$ along a reaction path that does not include formation of a CO intermediate.

Still an additional invention embodiment is directed to fuel cells with low freezing points.

DETAILED DESCRIPTION

Figure 1:
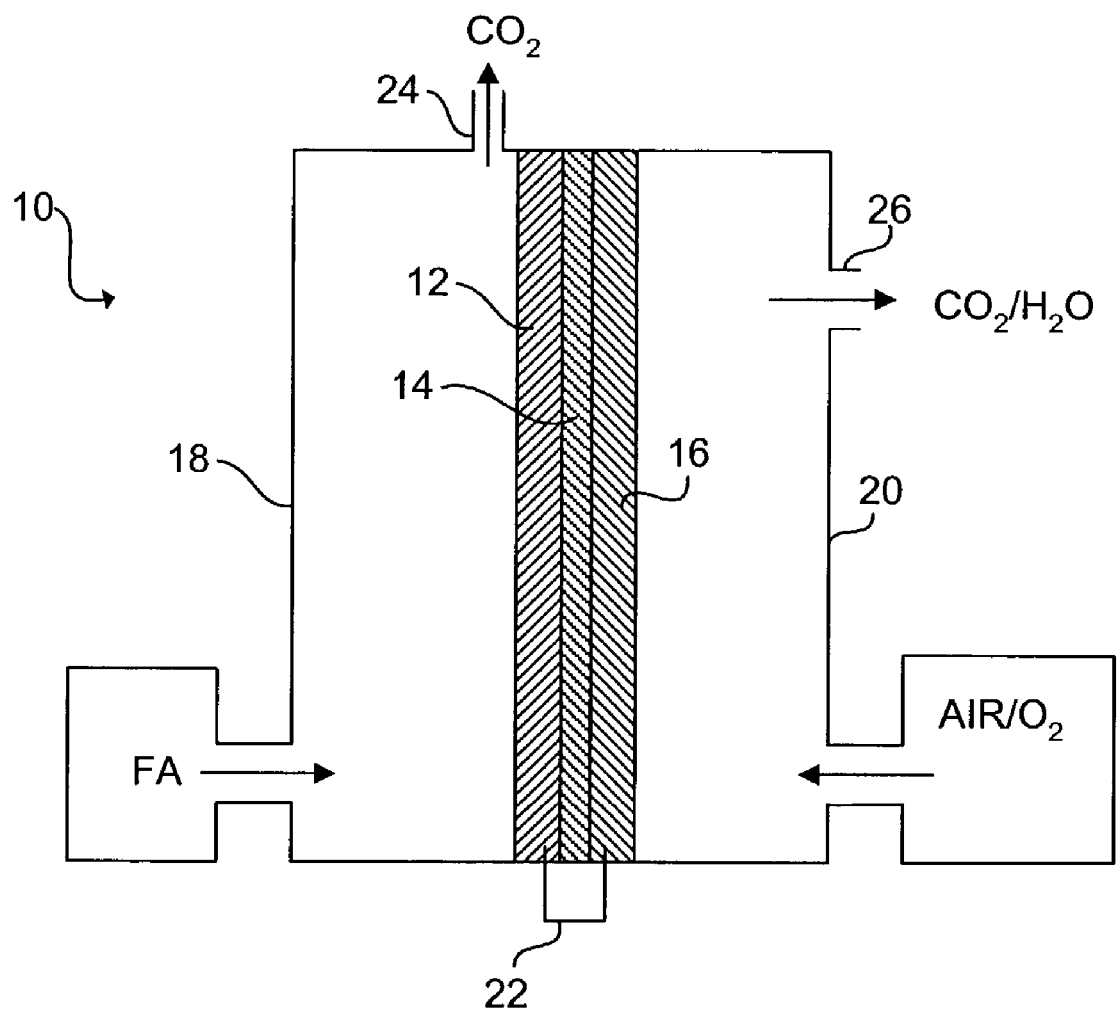
FIG. 1 is a schematic of an exemplary fuel cell of the invention.

The schematic of FIG. 1 shows an exemplary direct organic fuel cell of the invention generally at 10. The fuel cell 10 includes an anode 12, a solid polymer proton-conducting electrolyte 14, and a gas diffusion cathode 16. The anode 12 is enclosed in an anode enclosure 18, while the cathode 16 is enclosed in a cathode enclosure 20. When an electrical load (not shown) is connected between the anode 12 and cathode 16 via an electrical linkage 22, electro-oxidation of an organic fuel occurs at the anode 12 and electro-reduction of an oxidizer occurs at the cathode 16.

The occurrence of different reactions at the anode 12 and cathode 16 gives rise to a voltage difference between the two electrodes. Electrons generated by electro-oxidation at the anode 12 are conducted through the linkage 22 and are ultimately captured at the cathode 16. Hydrogen ions or protons generated at the anode 12 are transported across the membrane electrolyte 14 to the cathode 16. Thus, a flow of current is sustained by a flow of ions through the cell and electrons through the linkage 22. This current may be exploited to power an electrical device, for instance.

The anode 12, solid polymer electrolyte 14, and cathode 16 are preferably a single multi-layer composite structure that may be referred to as a membrane electrode assembly ("MEA"). Preferably the solid polymer electrolyte 14 is a proton-conducting cation exchange membrane that contains an anionic sulfate, such as the perfluorinated sulfonic acid polymer membrane commercially available under the registered trademark NAFION from DuPont Chemical Co., Delaware. NAFION is a copolymer of tetrafluoroethylene and perfluorovinylether sulfonic acid. Other membrane materials can also be used, with examples including membranes of modified perfluorinated sulfonic acid polymer, polyhydrocarbon sulfonic acid, membranes containing other acidic ligands and composites of two or more kinds of proton exchange membranes.

Each of the anode 12 and the cathode 16 may include a catalyst layer with an example being fine Pt particles either supported or unsupported. When using a preferred unitary MEA, the anode 12 and cathode 16 may consist of catalyst layers directly applied to opposite sides of the NAFION membrane. NAFION is available in standard thicknesses that include 0.002 in. and 0.007 in. A unitary MEA may be fabricated by directly "painting" anode and cathode catalyst inks onto opposing surfaces of the membrane 14. When the catalyst ink dries, solid catalyst particles adhere to the membrane 14 to form the anode 12 and the cathode 16.

If the catalyst is to be supported, a suitable support includes fine carbon particles or high surface area carbon sheeting that makes electrical contact with the particles of the electrocatalyst. By way of particular example, the anode 12 may be formed by mixing electrocatalyst materials such as a metal with a binder such as NAFION, and spread on carbon backing paper at an exemplary loading of between about 0.5–5 mg/cm$^2$. The backing paper can then be attached to a surface of the NAFION membrane 14. The cathode electrocatalyst alloy and the carbon fiber backing may contain about 10–50% (by weight) TEFLON to provide hydrophobicity to create a three-phase boundary and to achieve efficient removal of water produced by electro-reduction of oxygen. The cathode catalyst backing is attached to the surface of the NAFION electrolyte membrane 14 opposite of the anode 12.

The exemplary fuel cell 10 operates using a formic acid fuel solution although other fuels are contemplated. The formic acid fuel solution is supplied to the anode enclosure 18, while an oxidizer such as air or higher concentrated $O_2$ is supplied to the cathode enclosure 20. At the anode 12 the formic acid fuel is oxidized:

$$HCOOH \rightarrow 2H^+ + CO_2 + 2e^- \qquad \text{(Rctn. 1.)}$$

The $CO_2$ product flows out of the chamber via a gas removal port 24. It has been discovered that a generally tubular gas removal port having an inside diameter less than about 1/32 in., and preferably about 1/32 in. or less, and a length of at least about 1/32 in. allows passage of the $CO_2$ gas, while substantially preventing passage of formic acid. Preferably the removal port 24 has a length to diameter ratio of at least about 0.5. Also, the port 24 is preferably made of a hydrophobic material, with an exemplary material including the fluorocarbon-based polymer commercially available from 3M Corporation, MN under their registered trademark as KEL-F.

The H+ product of Rctn. 1 passes through the polymer electrolyte layer 14 to the cathode 16, and the free electron $e^-$ product flows through the electrical linkage 22 to the cathode 16. At the cathode 16 the reduction reaction:

$$O_2 + 2e^- + 2H^+ \rightarrow 2H_2O \qquad \text{(Rctn. 2.)}$$

occurs. The $H_2O$ product flows out of the cathode enclosure 20 via a removal port 26. Pumps or other means may be provided to drive the flow of the formic acid fuel solution and of the air/$O_2$.

It has been discovered that use of a formic acid fuel solution for oxidation at the anode 12 provides many advantages. Formic acid is a relatively strong electrolyte and thus facilitates good proton transport within the anode enclosure 18. It has a relatively low vapor pressure, and remains in liquid state at room temperature. Also, formic acid/oxygen fuel cells of the invention have a high theoretical open circuit potential or emf of about 1.45 V.

It has also been discovered that formic acid enjoys very low diffusion and drag crossover rates across the solid polymer electrolyte membrane 14. This provides additional valuable benefits for formic acid fuel cells of the present invention. Formic acid partially dissociates when dissolved in water to form an anion. It is believed that the anion is attracted by the anode 12 and is repelled by the anionic sulfate groups in the preferred polymer electrolyte membrane 14, thereby hindering osmotic drag and diffusion through the electrolyte membrane 14. This results in a substantial reduction or elimination of fuel crossover through the electrolyte membrane 14.

Low fuel crossover is beneficial for a number of reasons. For example, low crossover allows the fuel cell 10 to be run at high fuel concentrations. It is believed that formic acid concentrations of from about 10% (by weight) to about 95% will provide reasonable performance. High fuel concentrations provide high current densities and high power output per unit area, and also reduce or eliminate water management problems of the prior art. Low fuel crossover rates also greatly reduce or eliminate poisoning of the cathode 16. This likewise significantly improves performance of the fuel cell 10. Still an additional benefit of the formic acid fuel solution is that it is believed only negligible amounts of CO gas are produced when a 25–140° C. platinum catalyst is exposed to gaseous formic acid. Methanol, on the other hand, is believed to yield substantial carbon monoxide product under similar conditions.

The present invention is not limited to formic acid fuel cells. Other invention embodiments include direct organic fuel cells with an organic fuel solution including at least about 10% (by wt.), and preferably greater than about 25%, organic fuel with an electrolyte membrane operative to achieve a low fuel solution crossover rate. Expressed in units of current, membranes of exemplary fuel cells of the invention are operative to limit fuel solution crossover to an amount less than that required to produce about 30 ma/cm² electrolyte membrane at about 25° C. Although formic acid is a preferred organic fuel, other organics may include methanol and other alcohols, formaldehyde and other aldehydes, ketones, di- and tri-methoxy methane and other oxygenates.

It has been discovered that high fuel concentrations may be achieved using organics other than formic acid through careful design of the electrolyte to provide little or no fuel crossover. For example, it has been discovered that by selecting a suitable electrolyte polymer membrane thickness fuel crossover can be kept below some critical value $j_f^c$ below which the fuel cell continues to operate. To a reasonable approximation the crossover rate of fuel $j_f$ is given by:

$$j_f = \frac{n_f D_f C_f K_f}{t \Im} \qquad \text{(equn. 1)}$$

where $C_f$ is the fuel concentration over the anode, $D_f$ is the effective diffusivity of the fuel in the membrane electrode assembly, $K_f$ is the equilibrium constant for partition coefficient for the fuel into the membrane, t is thickness, $\Im$ is Faraday's constant and $n_f$ is the number of electrons released when 1 mole of fuel is oxidized ($n_f$=2 for formic acid and 6 for methanol). Rearranging equn. 1, allows one to calculate the minimum membrane thickness to obtain a sufficiently low crossover:

$$t = \frac{n_f D_f C_f K_f}{\Im j_f^c} \qquad \text{(equn. 2)}$$

Taking methanol and formic acid fuel cells as an example, it is believed that the performance of the fuel cells substantially degrades when $j_f^c$>about 200 ma/cm² and that optimal operation occurs when $j_f^c$ is about 30 ma/cm² or less. It will be appreciated that values for $j_f^c$ may be empirically determined for any desired organic fuel solution. Using data from the literature for the permeation of 10 M formic acid and methanol through 1100 equivalent weight NAFION membranes, one calculates a minimum MEA thickness of approximately 30 microns for formic acid and 600 microns for methanol.

Another aspect of the present invention is directed to anode catalysts for use with direct organic fuel cells. Catalysts of the invention include nanoparticles of metals with coatings of at least one additional metal on their surface. The coatings can be continuous films with a thickness of about 2 nm or less, or the coatings can be discrete formations or islands. As used herein, the terms "discrete formations" and "islands" as used in this context are intended to broadly refer to substantially discontinuous groupings of the second metal on the first metal surface. Preferably, the discrete formations or islands are no more than 3 nm thick, and are mono or two layer.

Metals believed useful for the metal particles and the coating layers or islands in catalysts of the invention include Pt, Pd, Ru, Re, Ir, Au, Ag, Co, Fe, Ni, Y, and Mn. Preferred examples include Pt particles with one or more of Pd or Ru coated thereon, and most preferably Pt with Pd. Also, the material for the metal particles and the coating can be interchanged. By way of example, Pt islands could be applied to a Pd particle. In an exemplary preferred Pt/Pd catalyst, between about 10% and about 90% of the catalyst surface is covered with Pd. Most preferably about 60% is covered with Pd. Islands of Pt could likewise be applied to particles of Pd or Ru. It has also been discovered that catalysts of the invention provide most beneficial results when the surface composition differs from the bulk composition. This may be achieved, for example, by making a catalyst of the invention through spontaneous deposition. Catalysts of the invention are believed to be useful when used with any of several direct organic fuel cells, with examples including formaldehyde and alcohols including methanol.

Exemplary catalyst loadings of the invention when used with formic acid fuel cells of the invention are between about 0.1 mg/cm$^2$ and about 12 mg/cm$^2$. With air feed, a preferred loading is about 4 mg/cm$^2$. Increases do not appear to substantially change current production. Loadings above about 12 gm/m$^2$ substantially slow current output. Air breathing cells generally require less catalyst on the anode. Levels of down to about 0.1 mg/cm$^2$ are believed useful.

The catalysts of the invention have been discovered to be particularly advantageous when used with formic acid fuel cells of the invention, although use with other organics will also be advantageous. For example, it has been discovered that current and power density from the formic acid fuel cell 10 is significantly enhanced through use of catalysts of the invention. The preferred Pt/Pd catalyst has been discovered to increase formic acid fuel cell current density by a factor of up to about 80 as compared to a Pt catalyst.

Another benefit of the preferred Pt/Pd catalyst relates to the formic acid oxidation reaction mechanisms it is believed to promote. Formic acid electrooxidation is believed to occur primarily via two parallel reaction pathways in the presence of a metal catalyst such as Pt. One is via a dehydration mechanism that forms CO as an intermediate:

  (Rctn. 3.)

  (Rctn. 4.)

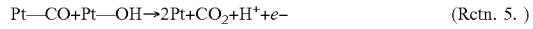  (Rctn. 5.)

Formic acid adsorbs onto the Pt surface forming an intermediate adsorbed CO species (Rctn. 3). An adsorbed OH group (formed in Rctn. 4) is then required to further oxidize the adsorbed CO intermediate into gaseous $CO_2$ (Rctn. 5).

The second reaction pathway is more direct, and follows a dehydrogenation mechanism:

  (Rctn. 6.)

This reaction path forms the product $CO_2$ directly and circumvents the adsorbed CO intermediate poisoning step with the result that substantially no CO intermediate is formed. This direct pathway has the advantage that less of the catalyst is poisoned by CO, so less platinum is needed in the fuel cell 10 and high current densities can be obtained. This direct reaction path also enhances the overall reaction rate, especially at lower anode potentials where surface OH$^-$'s are not available on Pt. Finally, in addition to poisoning the catalyst, CO formation is generally undesirable due to its poisonous nature. It is believed that the preferred Pt nanoparticle catalyst with Pd islands on its surface promotes Rctn. 6 without promoting Rctn. 3. Thus use of the preferred catalyst solves many problems of the prior art related to CO formation.

Figure 2:
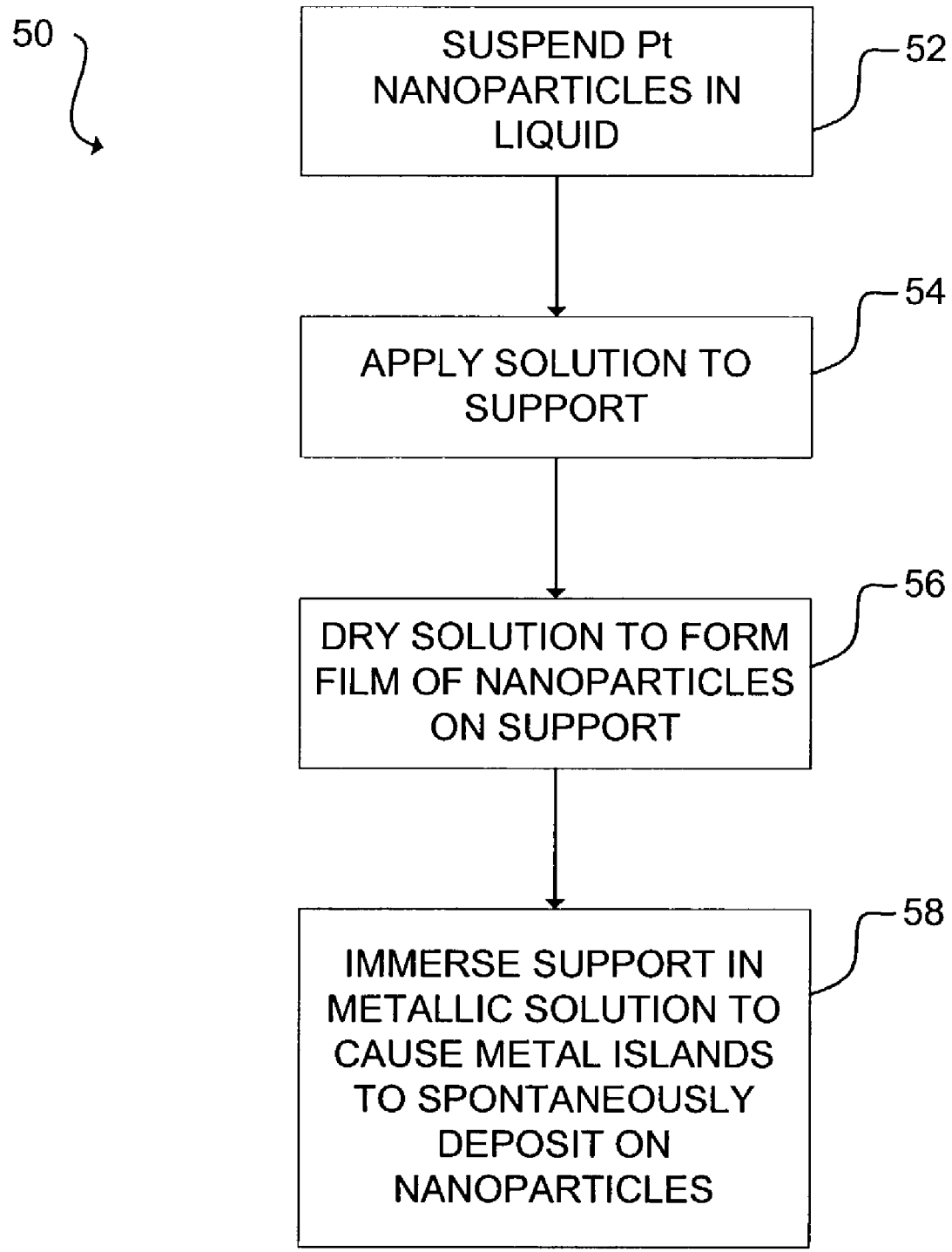
FIG. 2 is a flowchart illustrating an exemplary method of making a catalyst of the invention.

Still another aspect of the invention is directed to a method for making anode catalysts of the invention. The flowchart of FIG. 2 illustrates the steps of an exemplary method 50 for making a catalyst of the invention. Pt nanoparticles are suspended in a liquid (block 52). The suspension is then applied to a support such as a carbon backing, gold disk, or the like (block 54). The suspension is then dried to form a thin film of the Pt nanoparticles on the support (block 56). Finally, the support is immersed in an ionic metallic solution to cause spontaneous deposition of islands of the metal onto the surface of the Pt nanoparticles (block 58).

Yet another aspect of the present invention is directed to fuels cells having a fuel solution with a freezing point below about 0° C., preferably below about −5° C., and more preferably below about −10° C. Fuel cells of the invention having a sufficiently high organic fuel concentration will provide these advantages. A formic acid fuel cell of the invention having a concentration of at least about 20% (by wt.), for example, will have a freezing point below about −10° C. By way of additional example, Table 1 shows the minimum fuel concentration needed for different exemplary organic fuels contemplated for use in fuel cells of the invention to reduce the freezing point to the water-fuel mixture to below about −10° C.

TABLE 1

Fuel concentrations needed to reduce the freezing point of a fuel water mixture to below −10° C.

| Fuel | Minimum Concentration |
| --- | --- |
| Methanol | 14% |
| Formic Acid | 20% |
| Ethylene Glycol | 23% |
| Ethanol | 18% |
| Glycerol | 32% |
| 2-propanol | 20% |

In an additional aspect of the invention, an anti-freeze agent may be added to a fuel cell fuel solution to lower the freezing temperature of the solution. Exemplary anti-freeze agents include inorganic acids such as sulfuric acid, hydrochloric acid, nitric acid, phosphoric acid, and perchloric acid. These agents may be added either alone or in combination to lower the fuel solution freezing temperature to below about 0° C., preferably below about −5° C., and more preferably to below about −10° C. Table 2 illustrates exemplary anti-freeze agents and required concentrations to lower a 1% methanol fuel solution freezing temperature to below about −10° C.

TABLE 2

Acid concentrations needed to reduce the freezing point of a 1% methanol in water mixture to below −10° C.

| Acid | Minimum Concentration |
| --- | --- |
| Sulfuric | 17% |
| Hydrochloric | 8% |
| Phosphoric | 26% |
| Nitric | 14% |

It is noted that the fuels and acids in Tables 1 and 1 are examples only, and a series of fuels and mineral acids will work as well. Also, it will be appreciated that the benefits associated with low freezing point fuel solutions will be valuable in a wide range of fuel cells that are not limited to organic fuel cells. By way of particular example, the present invention contemplates addition of an anti-freeze to a hydrogen fuel cell, for example.

In order to best illustrate various aspects of the invention, several exemplary fuel cells of the invention were operated using varying fuel concentrations and different catalysts of the invention. The performance of these exemplary cells and catalysts is discussed below.

Exemplary Fuel Cell 1:

The first exemplary fuel cell is generally consistent with the fuel cell 10 shown in FIG. 1. Element numbers from that fuel cell will be used where appropriate for convenience. The exemplary fuel cell's membrane electrode assembly (MEA) including an anode 12, a NAFION electrolyte membrane 14, and a cathode 16 was fabricated using a direct paint technique to apply catalyst layers 12 and 16 to the NAFION membrane 14. The NAFION membrane used in each of the exemplary fuel cells had a thickness of about 0.007 in. The active cell area was 5 cm². Catalyst inks were prepared by dispersing catalyst nanoparticles into appropriate amounts of Millipore purified water and 5% recast NAFION solution (1100EW, Solution Technology, Inc.). Both the anode and cathode catalyst inks were directly painted onto either side of a NAFION 117 membrane. The resulting multi-layer MEA forms the anode 12, the electrolyte membrane 14, and the cathode 16.

The cathode catalyst used was unsupported platinum black (27 m²/g, Johnson Matthey) at a standard loading of about 7 mg/cm². A preferred Pt/Pd catalyst was used for the anode with a loading of about 4 mg/cm². This catalyst was prepared by loading Johnson Matthey Hispec 1000 palladium black into a gold boat. The boat was next immersed in a palladium (II) nitrate solution (5 mM $Pd(NO_3)_2$+0.1 M $H_2SO_4$) for about five minutes. The catalyst was rinsed with Millipore water, then cyclic voltammetry was used to remove the nitrate. The boat was again immersed in a palladium (II) nitrate solution (5 mM $Pd(NO_3)_2$+0.1 M $H_2SO_4$) for about five minutes. The catalyst was rinsed with Millipore water, then cyclic voltammetry was used to remove the nitrate. The catalyst particles were then dried.

The first exemplary fuel cell 10 included an anode enclosure 18 and a cathode enclosure 20 machined into conductive graphite blocks. A carbon cloth diffusion layer (commercially available from E-Tek, Somerset, N.J.) was placed on top of both the cathode and anode catalyst layers. The formic acid fuel solution entered the anode enclosure 20 through plastic Swagelock fittings. The MEA and carbon cloth forming the layers 12, 14 and 16 are sandwiched between the two enclosures 18 and 20 and sealed with 35 durometer Si gasketing. The graphite block enclosures 18 and 20 were housed between two heated stainless steel blocks. Single sided PC boards, placed in between the stainless steel blocks and the backsides of the machined graphite blocks, acted as current collectors.

The MEA layers 12, 14, and 16 were initially conditioned within the fuel cell at 60° C. with $H_2/O_2$ (anode/cathode) fuel cell mode for 1–2 hours, while holding the cell potential at 0.6 V using a fuel cell testing station (Fuel Cell Technologies, Inc.). The $H_2$ flow rate was set to 200 scc/min, the gas stream was humidified to 75° C. prior to entering the cell, and a backpressure of 30 psig was applied. The $O_2$ flow rate was 100 scc/min, the gas stream was humidified to 70° C., and a backpressure of 30 psig was applied. After conditioning with $H_2/O_2$, cell polarization curves were obtained at 60° C. For the cell polarization measurements the anode fuel used was formic acid (Aldrich, 96% A.C.S. grade). On the cathode $O_2$ was supplied at a flow rate of 100 scc/min without any backpressure, humidified to 70° C.

Anode 12 polarization curves were acquired by replacing the cathode 16 $O_2$ gas stream with $H_2$. The anode 12 potential was controlled with a galvanostat/potentiostat (model 273, EG&G), at a scan rate of 1 mV/s. The platinum/$H_2$ combination on the cathode side of the fuel cell fixture acted as a dynamic hydrogen reference electrode (DHE), as well as a high surface area counter electrode. The $H_2$ flow rate was maintained at a rate of 100 scc/min, under a constant backpressure of 10 psig, humidified to 75° C. prior to entering the cell. Formic acid was supplied to the anode side of the fuel cell MEA, at a flow rate of 1 mL/min, acting as the working electrode for the electrochemical cell.

Figures 3, 3A, 3B:
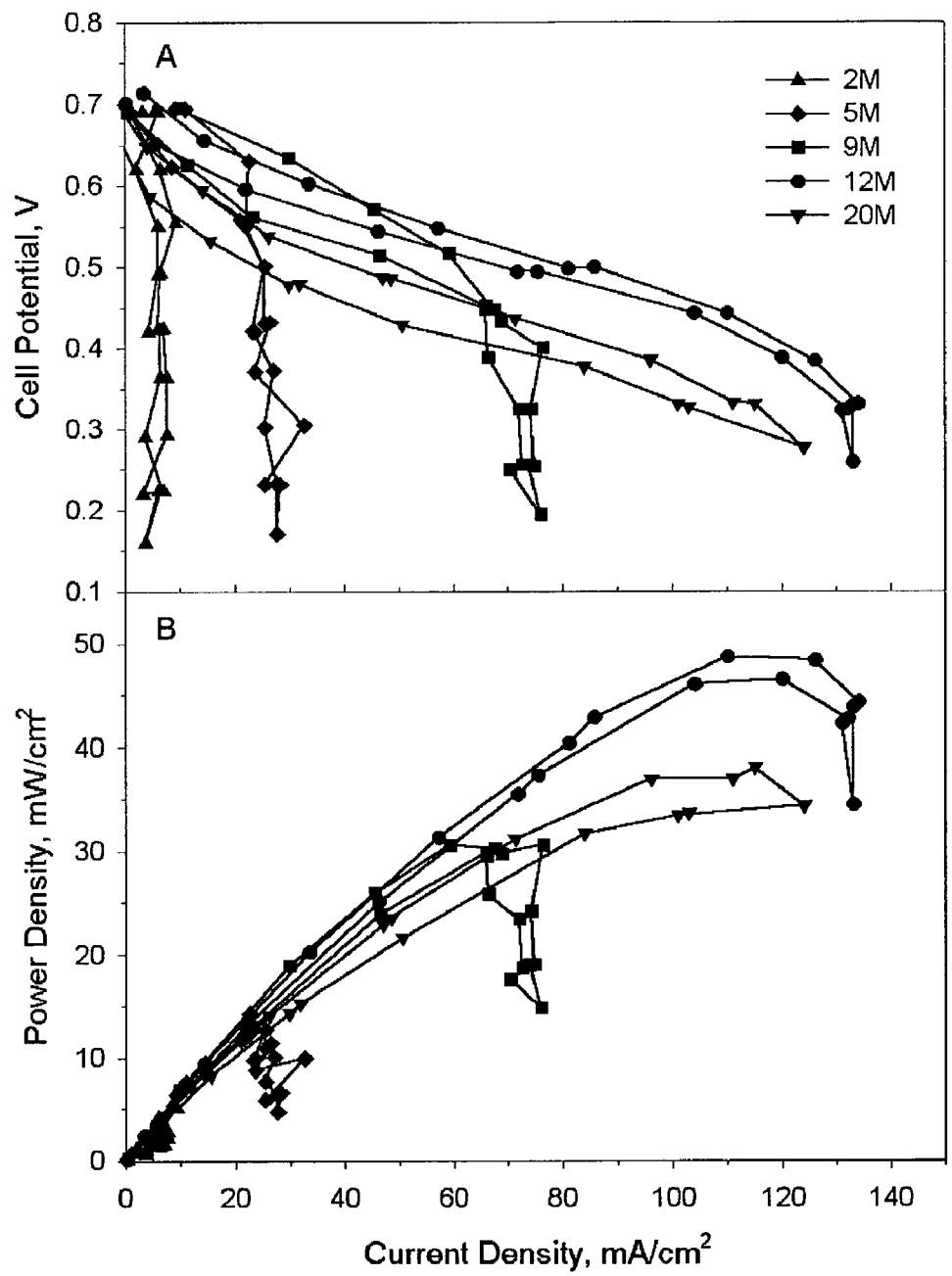
FIGS. 3(a) and (b) are data plots illustrating cell activity and power, respectively, vs. formic acid concentration for a first exemplary formic acid fuel cell of the invention.

FIG. 3(a) illustrates cell polarization curves for the exemplary fuel cell using a range of formic acid fuel solution concentrations. Cell polarization curves measure the overall cell activity at the various anode fuel feed concentrations. The cell polarization curves of FIG. 3(a) were acquired over a formic acid fuel solution concentration range of about 2 M to 20 M.

It is noted that herein formic acid concentrations may be referenced in units of molar concentration and/or weight percent concentration. Those skilled in the art will appreciate that conversion between the two units is fairly straightforward. For convenience, an approximate conversion in ranges of interest is provided in Table 3:

TABLE 3

| Molar Conc. | Approx. Wt. % Conc. |
|---|---|
| 1 | 5 |
| 2 | 9 |
| 4 | 18 |
| 5 | 22 |
| 9 | 39 |
| 11 | 46 |
| 13 | 54 |
| 15 | 61 |
| 17 | 69 |
| 20 | 79 |

As illustrated By FIG. 3(a), cell activity increases with feed concentration. There is little activity for 2 M formic acid. At fuel feed concentrations at and below 10 M, it is believed that a mass transport limitation in the supply of formic acid to the anode 12 limits activity. Much better results are obtained using formic acid concentrations of between about 10 M and about 20 M. For the exemplary cell, a maximum current was observed at 12 M formic acid, with a value of about 134 mA/cm² at 60° C. At formic acid concentrations of 20 M and above, the cell polarization curve profile drops.

The relatively high open circuit potential (OCP) of the exemplary formic acid fuel cell of about 0.72 V illustrated in FIG. 3(a) is a surprising and beneficial result. The typical OCP for a direct methanol fuel cell (DMFC) under similar conditions, for instance, is only around 0.6 V. The higher OCP of the fuel cell of the invention translates into a high power density and enhanced cell efficiency at lower applied loads. Within the optimal feed concentration range, between 10 M and 20 M formic acid, there is significant cell activity at high cell potentials (0.72 V to 0.50 V), unlike that found for DMFCs.

In FIG. 3(b), the data of FIG. 3(a) have been further processed and plotted in units of power density verses current density for the various formic acid concentrations. For concentrations below 10 M, the power density curves show an initial increase with current density, reaching a maximum value, followed by a sharp decrease. The decrease is believed to be due to mass transport limitations that cause fuel supply depletion. As the formic acid feed concentration is increased from 2 M to 12 M the initial power density slopes follow the same general trend prior to fuel supply depletion. For 2 M formic acid feed concentrations, a power density of about 5 mW/cm² is attained. The maximum power density in FIG. 3(b) occurs with a formic acid fuel solution concentration of about 12 M at about 48.8 mW/cm². The 20 M formic acid power density profile shows an overall loss in cell performance with a decrease in overall power density vs. current density.

It is noted that the maximum power density found for 12 M formic acid of about 48.8 mW/cm² at about 0.4 V compares favorably to a measured maximum power density for a DMFC under similar conditions (1 M methanol, 60° C., Pt based catalyst) of about 51.2 mW/cm² at about 0.27 V. Comparing the exemplary fuel at 0.4 V, the 12 M formic acid outperforms a typical 1 M methanol fuel cell, 48.8 mW/cm² vs. 32.0 mW/cm², respectively.

FIGS. 3(a) and 3(b) show that relatively high formic acid fuel solution concentrations are preferred in order to obtain reasonable current densities. It is believed that this is due to mass transport limitations. Two possible barriers hindering mass transport of formic acid to the anode might possibly be the NAFION within the catalyst layer and/or the carbon cloth. On the higher end of the investigated concentration spectrum (at and above 20 M), the exemplary fuel cell showed a large drop in potential causing a negative shift in cell activity. It is believed that this effect results from a drying out of the NAFION electrolyte membrane 14 and a corresponding loss of ion conductivity that occurs when the water concentration in the fuel solution becomes low. Accordingly, desirably high formic acid concentrations should be balanced against the need to maintain reasonable water concentrations.

It is believed that fuel cells of the invention will be practical using fuel solutions having a formic acid concentration of between about 5% and about 95% (by weight), with water concentrations between about 5% and about 95% (by weight). Formic acid concentrations between about 25% and about 65% (by weight) and water concentrations of at least about 30% (by weight) are generally more preferred. This water concentration is believed to maintain good ion conductivity through the electrolyte membrane 14. Whether the fuel cell is run with dry or humidified air will effect the most beneficial formic acid fuel concentrations. For example, when running with humidified air, a formic acid concentration of between about 50% and 70% (by weight) is believed most beneficial. When running with dry air and no agents are provided to promote water retention by the cathode, concentrations of between about 20% and 40% (weight) are believed most beneficial.

From about 1% to about 15% (by weight) alcohols, and preferably between about 5% and 15% (by weight) alcohols, with an example being ethylene glycol, may also be present. The alcohols may be useful as a medium for dissipating reaction heat to allow the fuel cell 10 to operate at relatively low temperatures, as well as for other reasons.

Figure 4:
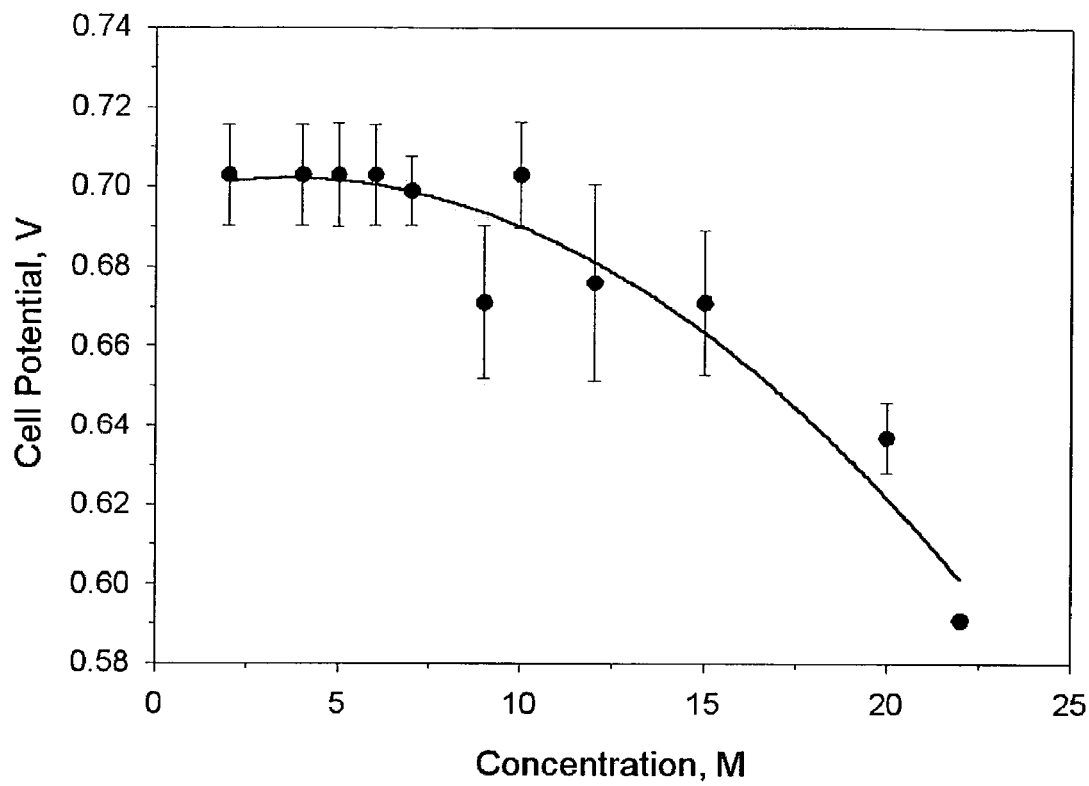
FIG. 4 is a data plot illustrating the effects of formic acid concentration on the open circuit potential of the first exemplary formic acid fuel cell of the invention.

FIG. 4 illustrates the effects of formic acid concentration on the open circuit potential (OCP) of the exemplary fuel cell. The feed concentration range investigated was from about 2 M to about 22 M formic acid at a flow rate of about 1 mL/min. At lower fuel cell feed concentrations a maximum OCP of about 0.72 V is observed for the exemplary fuel cell. As the fuel feed concentration is increased, from 2 M to about 10 M formic acid, the OCP remains relatively constant. Above about 10 M the OCP for the exemplary fuel cell begins to decrease.

Figure 5:
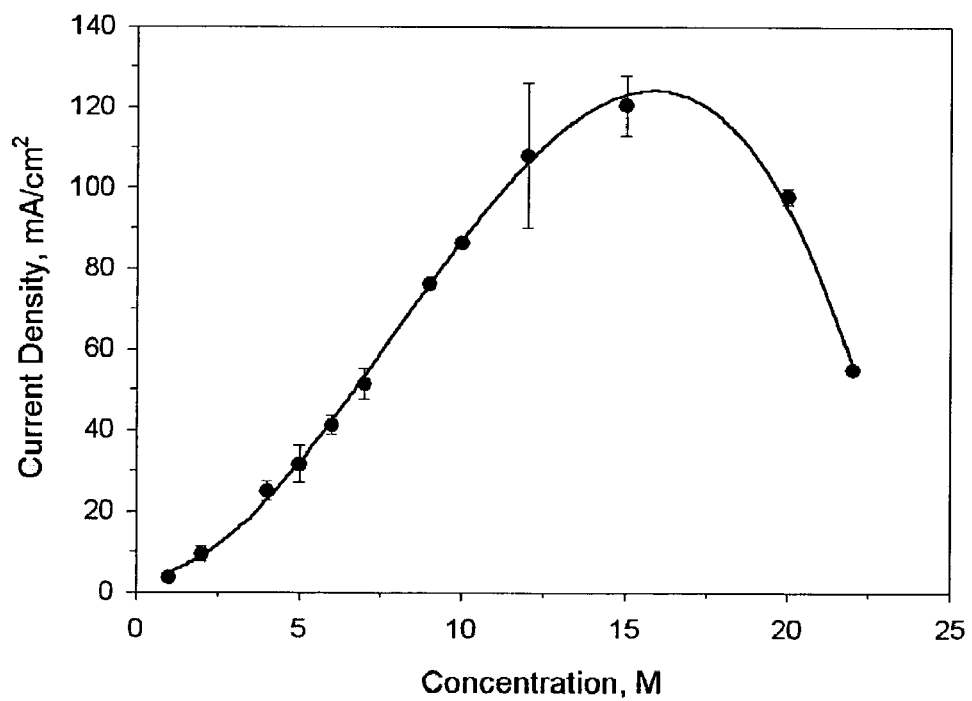
FIG. 5 is a data plot illustrating the effects of formic acid concentration on the current density at 0.4 V for the first exemplary fuel cell.

In FIG. 5, effects of formic acid concentration on current density at 0.4 V cell potential are illustrated for the exemplary fuel cell. The formic acid fuel solution concentration range studied was between about 1 M and about 22 M at a flow rate of about 1 mL/min. The current density was attained from cell polarization curves at 0.4 V. There is little activity at the lower fuel feed concentrations. Activity increases with increasing formic acid concentration, with maximum activity observed for fuel solutions between about 10 M and about 20 M. A maximum current of about 120 mA/cm² of electrolyte membrane is observed for a fuel solution of about 15 M. The cell activity begins to decrease for feed concentrations of greater than about 15 M, and appears to drop sharply at concentrations of about 20 M and higher. It is noted that in this first and third exemplary fuel cells discussed herein the area of the anode and cathode are substantially the same, and are substantially equal to the area of the electrolyte membrane. Also, unless noted otherwise, current and power densities discussed herein will be expressed in units of area of the electrolyte membrane (for the exemplary fuel cells 1 and 3), current and power density values will be expressed in units of area of Pt surface for exemplary fuel cell two.

Figure 6:
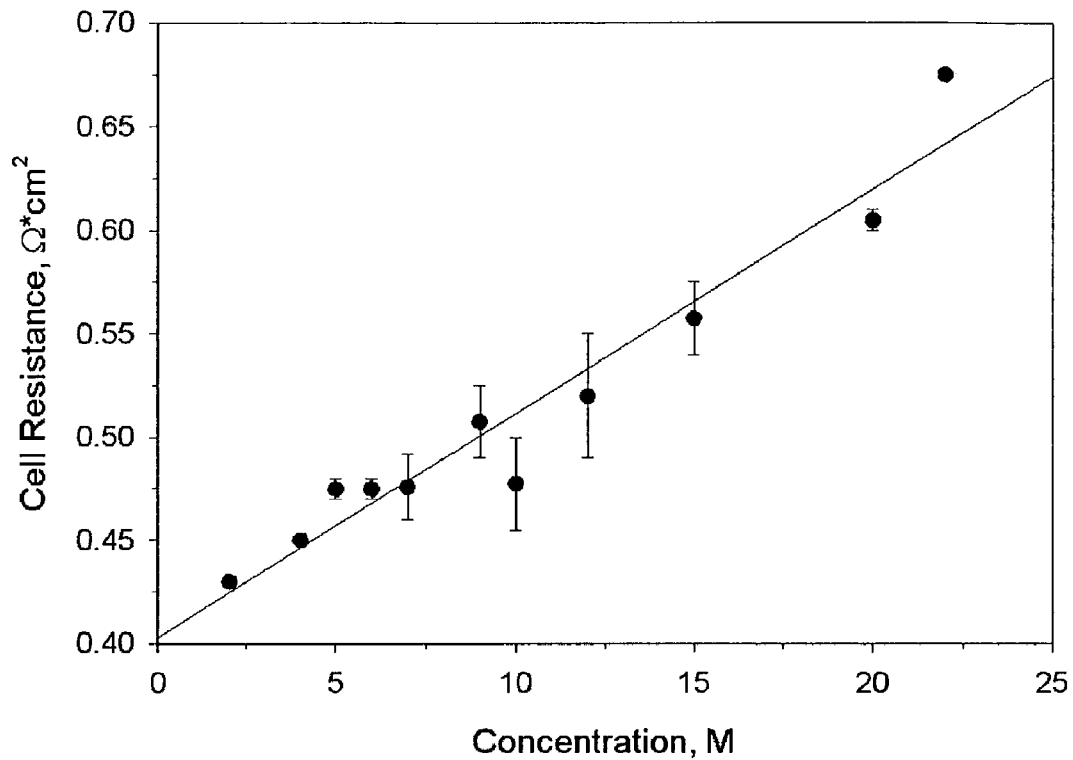
FIG. 6 is a data plot illustrating the effects of formic acid concentration on the resistance of the first exemplary fuel cell.

FIG. 6 illustrates the effects of formic acid concentration on the high frequency cell resistance of the exemplary fuel cell. During the cell polarization curve acquisition, the high frequency cell resistance was measured. The resistance steadily increased with formic acid feed concentration, from about 0.43 Ω/cm² to about 0.675 Ω/cm², at 2 M and 22 M, respectively. This is believed to be primarily related to the lower conductivity that occurs when the NAFION membrane dries out at high formic acid concentrations and its conductivity decreases.

The trends apparent in FIGS. 3 through 5 may be summarized as: (1) a decrease in OCP at formic acid feed fuel solution concentrations above about 10 M, (2) a decrease in cell polarization current densities at formic acid fuel solution concentrations at and above about 20 M, and (3) an approximately linear increase in fuel cell resistance with formic acid fuel solution concentration. It is believed that a common phenomenon is behind all of these trends. In particular, it is believed that dehydration of the polymer electrolyte membrane 14 as the water concentration in the formic acid fuel solution drops causes these trends. The preferred fuel solution concentration range that include formic acid at between about 40-65% (by weight) and water at least about 30% (by weight) are believed to lead to favorable performance.

Figure 7:
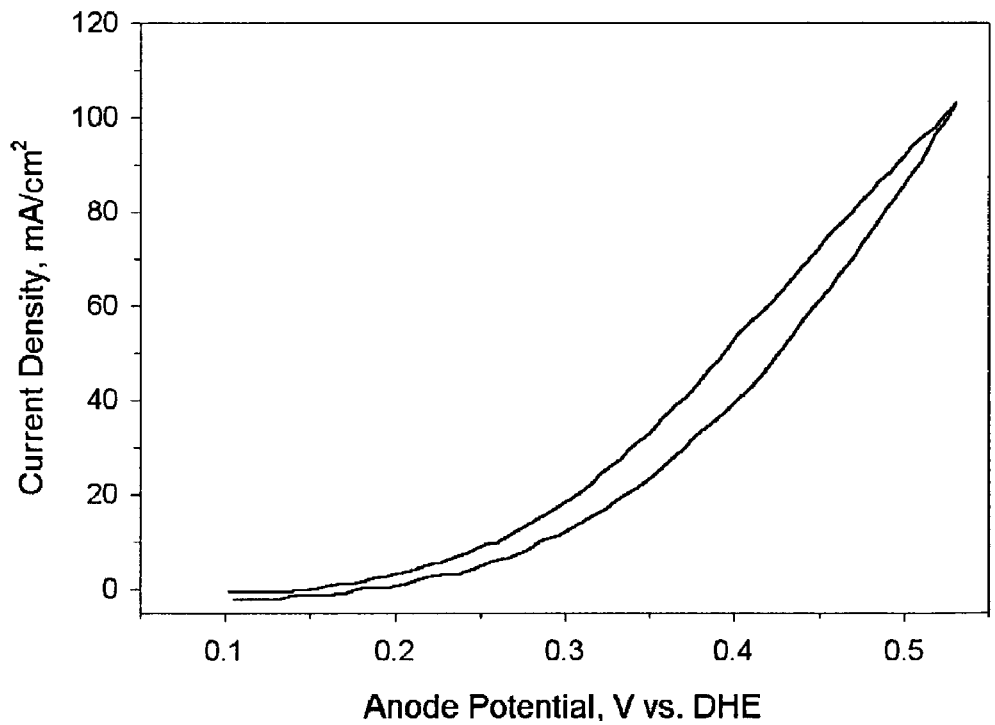
FIG. 7 is a data plot illustrating the anode polarization curve for 12 M formic acid for the first exemplary fuel cell.

FIG. 7 plots the anode polarization curve for 12 M formic acid. The data of FIG. 7 differ from the cell polarization data of FIG. 2 in that the potential is directly referenced against a dynamic hydrogen reference electrode (DHE). This removes the effects of the cathode, thereby facilitating the quantitative interpretation of the catalyst/fuel performance results. FIG. 7 shows that initial formic acid oxidation begins at about 0.15 V vs. DHE for the exemplary fuel cell. This is advantageous as compared to the potential at which oxidation of methanol begins in a DMFC.

Exemplary Fuel Cell Equivalent 2:

An exemplary formic acid equivalent cell was operated to further illustrate performance of catalysts of the invention. In this equivalent cell, catalysts of the invention include Pt nanoparticles decorated with discrete deposits or islands of a second metal such as Pd or Ru. Other catalysts of the invention include Pt nanoparticles having deposits of both Ru and Pd ("Pt/Pd/Ru"). These two catalysts were illustrated using the third exemplary fuel cell.

A three-electrode electrochemical cell was used with a coiled, platinized Pt wire as a counter electrode and Ag/AgCl in 3 M NaCl as the reference electrode. All potentials are reported vs. reversible hydrogen electrode, RHE. The working electrode was made of a Pt nanoparticle catalyst (platinum black, Johnson-Matthey) physically immobilized on the surface of a gold disk (12 mm in diameter, 7 mm in height). 0.1 M $H_2SO_4$ supporting electrolyte was prepared from concentrated sulfuric acid (double distilled from Vycor, GFS Chemicals) and the Millipore water. An 88% solution of formic acid in water (double distilled, DFS chemicals) was used, and ultra-high purity argon was used to deaerate all electrochemical cells used in this experiment. CO adsorption/stripping measurements were employed using ultra high purity CO (SJ Smith/ Matheson). EG&G Instruments PAR 283 Potentiostat/Galvanostat interfaced with a computer and CorrWare software (Scribner Associates) was used to power the cell.

An exemplary Pt/Pd catalyst of the invention was prepared through a method for making the catalyst of the invention that includes spontaneous deposition. A known amount of Pt-black nanoparticles were suspended in Millipore water (4 mg/ml of the catalyst). As used herein, the term nanoparticle is intended to broadly refer to particles having diameter from a few tenths of a nanometer to tens of nanometers. A 100-μl aliquot of the suspension was applied to a clean Au disk surface and allowed to air dry to form a uniform thin film of the catalyst. The Au disk is inactive to formic acid and serves as a convenient conducting support for the catalyst. No organic polymer was used to bind the catalyst to the Au disk so that a pristine catalyst surface is available for exposure to electrolytic media.

This Pt coated Au disk electrode was then cleaned by cyclic voltammetry with the potential ending at about the beginning of the platinum oxide range. The electrode was next immersed in a palladium (II) nitrate solution (5 mM $Pd(NO_3)_2$+0.1 M $H_2SO_4$) for about five minutes. After the deposition, the electrode was rinsed with Millipore water and treated by cyclic voltammetry to remove remnants of nitrate anions from the surface, as well as to reduce any palladium oxides that may have formed on the surface during deposition.

An exemplary ternary Pt/Pd/Ru and an exemplary Pt/Ru catalyst of the invention were also prepared by similar methods that use ruthenium in addition to or as an alternative to Pd. Namely, electrodes made of Pt/Pd nanoparticles (prepared as described above) or Pt nanoparticles on the Au disk were again voltammetrically cleaned and immersed in a ruthenium (iii) chloride solution (5 mm $RuCl_3$+0.1 m $HClO_4$) for about five minutes. After the deposition, the electrode was rinsed and treated by voltammetry to remove remnants of chloride as well as to reduce ruthenium oxides. The final cyclic voltammogram (CV) for the Pt/Pd/Ru electrode is shown in FIG. 8 as the dotted line.

It has been discovered that when preparing catalysts of the invention it may be advantageous to repeat the spontaneous deposition step 2–3 times. This repetition is believed to create layers having a thickness of between about 0.3 and about 3 nm. This thickness has been discovered to increase the service life of the catalysts. Repeating the step more than 3 times is believed to cause formations to be deposited that are thicker than about 3 nm. Layers of this thickness have been discovered to be subject to degradation by oxidation.

The real electrode surface area was determined from the hydrogen adsorption/desorption charge of the Pt surface before the Pd and/or Ru deposition. Despite distinct differences in the CV features between the clean, Pd decorated, and Pd and Ru decorated Pt nanoparticles, the total charge of the hydrogen adsorption/desorption on Pt/Pd and Pt/Pd/Ru was equal to that on clean Pt. This shows that there is a roughly 1:1 correlation between the number of adsorbed hydrogen atoms and the number of metal sites in all cases studied, which facilitates the real surface area determination.

Figure 8:
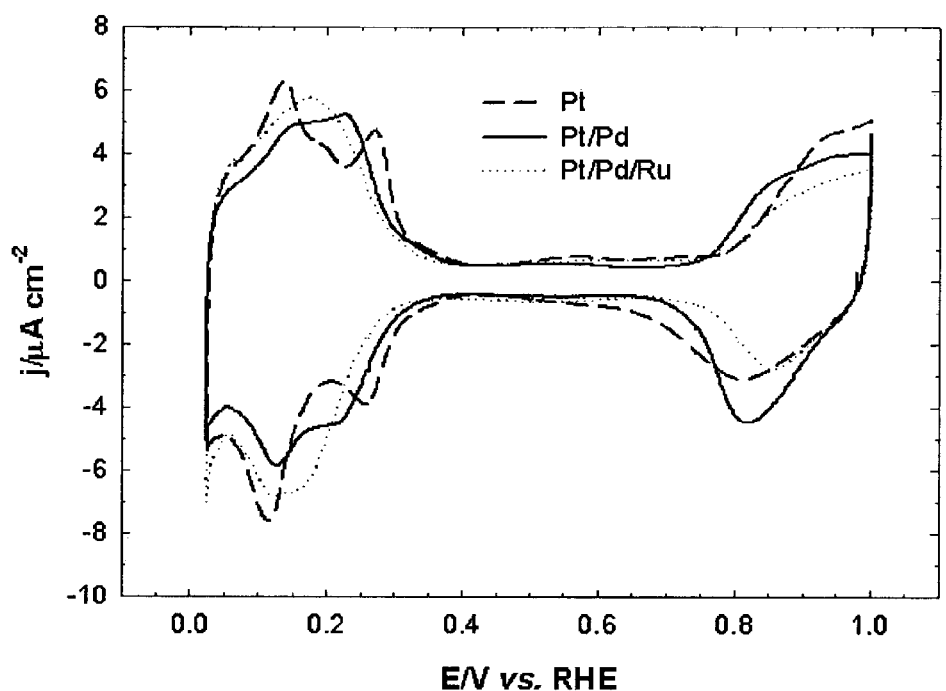
FIG. 8 is a data plot illustrating the cyclic voltammogram for exemplary catalysts of the invention in an exemplary fuel cell equivalent electrochemical cell.

The solid line curve of FIG. 8 represents voltammetric properties of the exemplary Pt/Pd catalyst of the invention. Current-potential peaks in the hydrogen adsorption-desorption region are broader and less defined than on clean Pt. These new voltammetric features, compared to Pt, are even more pronounced on the exemplary Pt/Pd/Ru catalyst (FIG. 8, dotted line). Surprisingly, the formation of surface oxides on the exemplary Pt/Pd catalyst starts at a potential about 50 mV lower than for clean Pt and, apparently, less surface oxides are formed in the traditional oxide range. Also, the double-layer charging current is smaller for the exemplary Pt/Pd and Pt/Pd/Ru catalysts.

Figure 9:
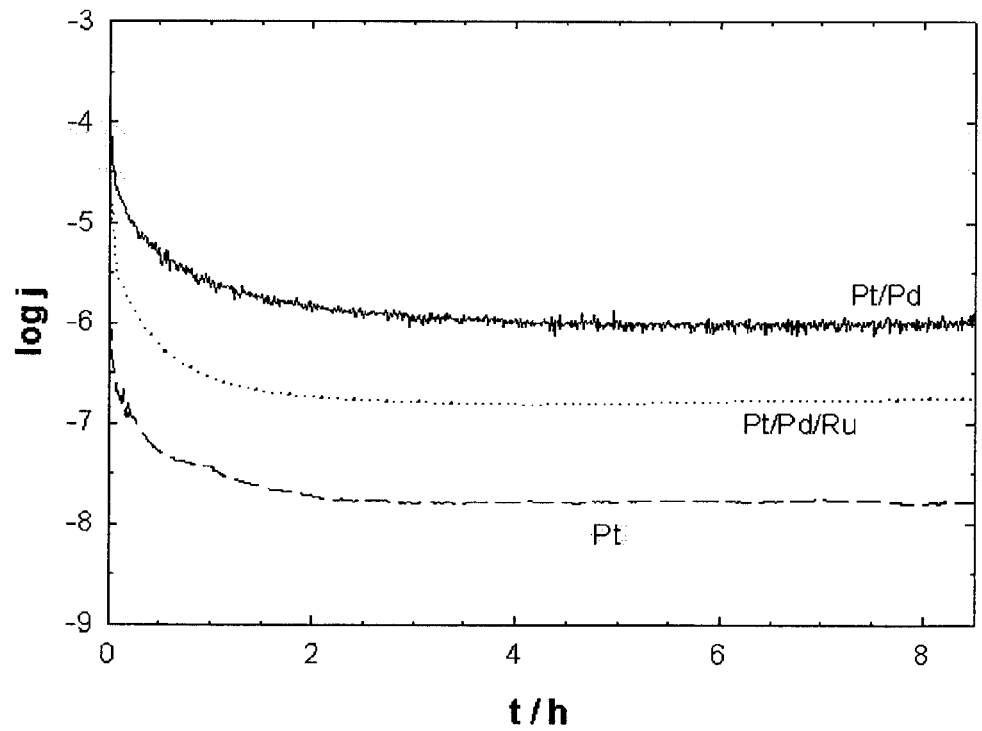
FIG. 9 is a data plot illustrating the reactivity of the exemplary catalysts in the exemplary fuel cell equivalent electrochemical cell.

FIG. 9 illustrates reactivity for the exemplary catalysts in the formic acid equivalent cell. In particular, FIG. 9 includes chronoamperometric curves for formic acid electrooxidation using the exemplary catalysts. To ensure steady-state behavior, the chronoamperometric experiments were run for 18 hours at about 0.27 V. Steady state was reached after about 6 hours, with only the initial 8 hours of the test runs depicted in FIG. 9. As illustrated, it has been discovered that the Pt/Pd catalyst of the invention is significantly more active when used with formic acid than is the Pt catalyst at this potential. The Pt/Pd/Ru catalyst of the invention was also discovered to offer advantages over Pt catalysts. The current densities were about 0.011 μA cm$^{-2}$, and 0.84 μA cm$^{-2}$ for the Pt and Pt/Pd catalysts, respectively. Note that for this exemplary cell current and power densities are expressed per unit cm of Pt surface. Thus the Pt/PD catalyst of the invention achieved an enhancement of about two orders of magnitude (about 80 times) in the reactivity over a Pt catalyst. This represents a surprising and beneficial result.

It is also noted that it has been discovered that the preferred Pt/Pd catalyst when used with a formic acid fuel cell of the invention facilitates formic acid oxidation at much lower potentials than is expected for methanol oxidation in known direct methanol fuel cells. For instance, for formic acid oxidation on Pt/Pd, current density of about 0.84 μa cm$^{-2}$ Pt at 0.27 V was measured, while methanol with a Pt/Ru catalyst had a reported current density of about 0.94 μa cm$^{-2}$ Pt at 0.4 v vs. RHE.

Figure 10:
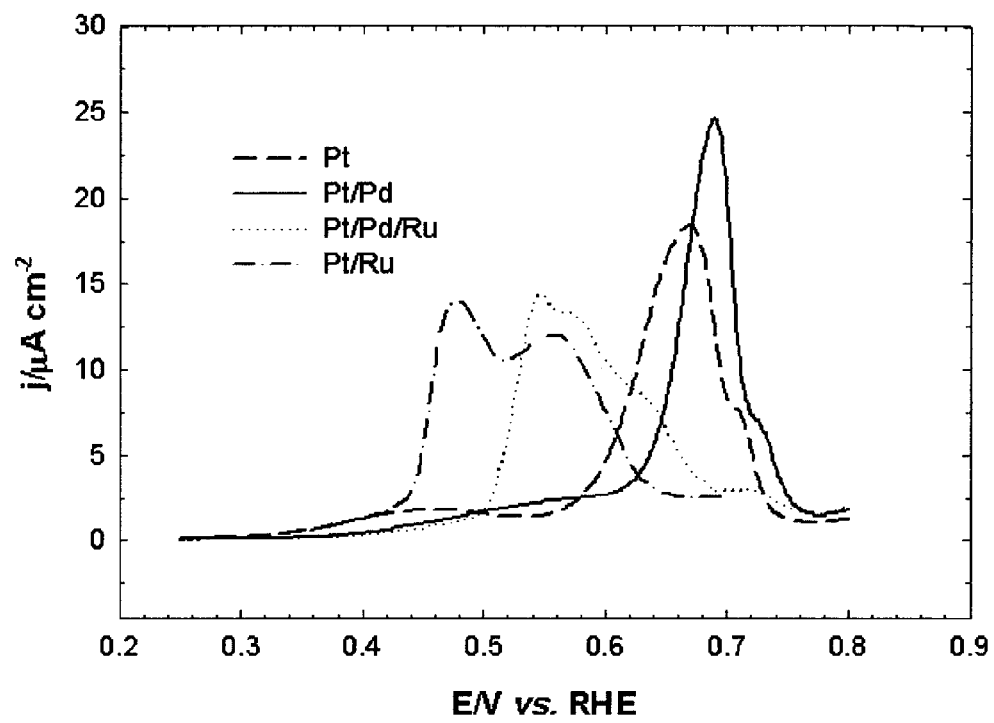
FIG. 10 is a data plot illustrating CO stripping voltammetry for exemplary catalysts of the invention.

To test the poisoning effects of CO, ultra-high purity CO was admitted to the exemplary fuel cell for 40 min, followed by purging CO out of the cell using high purity argon (for 20 min. at 0.13 V). FIG. 10 shows stripping voltammetry for the Pt catalyst electrode (dashed line), for an electrode with a Pt/Pd catalyst of the invention (solid line), for an electrode with a Pt/Pd/Ru catalyst of the invention (dotted line), and for an electrode with a Pt/Ru catalyst of the invention (dashed-dotted line).

On the clean Pt nanoparticle electrode, a "pre-wave" is observed starting at a potential as low as about 0.3 V, followed by the main peak appearance at 0.66 V. On Pt/Pd catalyst of the invention, the same pattern is seen, but the pre-wave is smaller and flatter, while the main peak is larger and sharper than on Pt. The pre-wave on Pt/Pd starts at a potential about 0.05 V more positive than on Pt, the potential of the main CO stripping peak increases from 0.66 V to 0.69 V for Pt and Pt/Pd nanoparticles, respectively. The total charge of the CO stripping is the same on Pt and Pt/Pd, and equal to about 330 μC cm$^{-2}$. Addition of Ru to the Pt/Pd nanoparticles produces about 0.15 V shift in the peak position, and the peak of surface CO oxidation current changed to about 0.55 V. The peak is broad and displays a clear fine structure, as if consisting of a number of overlapping peaks (FIG. 10, dotted line). The CO stripping peak appears at an even lower potential for the Pt/Ru nanoparticles. It is believed that a clear peak splitting occurs in this case due to the oxidation of CO from two different surface phases: Pt/Ru islands, and the unmodified ("clean") Pt parts of the surface. In summary, the data of FIG. 10 suggests that the Pt/Pd catalyst of the invention shows higher potential for the CO stripping, which may be interpreted as a lower CO tolerance, than does Pt.

The Pt/Pd catalyst of the invention appears to be particularly advantageous when used with formic acid fuel solutions of the invention. For example, FIG. 9 shows that the Pt/Pd surface shows higher steady state current while FIG. 10 shows that the Pt/Pd catalyst has a lower CO tolerance as evidenced by the higher potential for the CO stripping. This is another surprising and beneficial result or the preferred Pt/Pd catalyst. It is believed that this and other benefits are achieved because the Pt/Pd catalyst promotes the formic acid direct dehydrogenation reaction pathway of Rctn. 6 and not the dehydration pathway of Rctns. 3–5.

Exemplary Fuel Cell 3:

A third exemplary formic acid direct fuel cell was fabricated to further illustrate fuel cells of the invention as well as catalysts of the invention. The third exemplary fuel cell was generally consistent with the fuel cell 10 schematically shown in FIG. 1. Consistent element numbers will be used for convenience. Unitary membrane electrode assemblies (MEA) including the anode 12, the polymer electrolyte 14, and the cathode 16 were fabricated by directly painting catalyst inks onto opposing sides of a NAFION membrane. The active cell area was about 5 cm$^2$.

Catalyst inks were prepared by dispersing catalyst nanoparticles into appropriate amounts of Millipore water and 5% recast NAFION solution (1100EW, Solution Technology, Inc.). For all the exemplary MEAs prepared, the cathode 16 consisted of unsupported platinum black nanoparticles (about 27 m$^2$/g, Johnson Matthey) at a standard loading of about 7 mg/cm$^2$. Two different exemplary anode catalysts were compared with a standard Pt black catalyst (Johnson Matthey). The two exemplary catalysts were Pt black modified by a submonolayer of spontaneously deposited Ru ("Pt/Ru"), and Pt black modified by a submonolayer of spontaneously deposited Pd ("Pt/Pd"). The exemplary catalysts were prepared in the manner similar to that described above with reference to the exemplary fuel cell equivalent electrochemical cell, but without applying the suspension to a support, and drying the suspension to form a thin film on the support. Instead, catalyst powder was used as a self-standing catalyst and was exposed to the solution of the metal salt, to spontaneously deposit metal islands. All three catalysts had a loading to 4 mg/cm$^2$. A carbon cloth diffusion layer (E-Tek) was placed on top of both the cathode and anode catalyst layers, and both sides were TEFLON coated for water management.

The MEAs were initially conditioned at room temperature within the test cell with methanol/humidified H$_2$ (10° C. above cell temperature) (fuel cell anode/cathode) by running several anode polarization curves while slowly increasing to a final cell temperature of 80° C. The fuel cell cathode acted as a dynamic hydrogen reference electrode (DHE), as well as a high surface area counter electrode during this conditioning process. The H$_2$ flow rate was 100 scc/min under a 10 psig backpressure, and the gas stream was humidified to 10° C. above cell temperature. Methanol (IM) was supplied to the anode side of the fuel cell MEA, at a flow rate of 0.5 mL/min and acted as the working electrode for an electrochemical cell. The anode potential was controlled with a power supply (Hewlett Packard, model 6033A) the potential was step in 10 mV increments at 5 sec intervals.

The MEA was further conditioned at 80° C. while supplying H$_2$/O$_2$ (anode/cathode) in fuel cell mode, while holding the cell potential at 0.6 V for 1–2 hours. The cell potential was controlled with a fuel cell testing station (Fuel Cell Technologies, Inc). The H$_2$ flow rate was set to 200 scc/min, the gas stream was humidified to 95° C. prior to entering the cell, and a backpressure of 30 psig was applied. The O$_2$ flow rate was 100 scc/min, the gas stream was humidified to 90° C., and a backpressure of 30 psig was applied. After conditioning with H$_2$/O$_2$ the cell temperature was lowered to 30° C. A cell polarization curve with 4 M methanol (0.5 mL/min)/O$_2$ (100 scc/min, 40° C.) was acquired as the final conditioning step.

Cell polarization curves were obtained on each of the three-anode catalyst MEAs at 30° C. with 5 M formic acid (Aldrich, 96% A.C.S. grade) at a flow rate of 0.5 mL/min. O$_2$ was supplied to the cathode at a flow rate of 100 scc/min under 30 psi of backpressure, humidified to 40° C. Life tests were acquired at 0.6 V, 0.5 V, 0.4 V and 0.3 V in 5 M formic acid at a flow rate of 0.2 mL/min. O$_2$ was supplied to the cathode at a flow rate of 100 scc/min under 30 psi of backpressure, humidified to 40° C. The potential load was initially applied by stepping from the open circuit potential to 0.1 V, and then to the desired applied potential.

Carbon monoxide (CO) stripping cyclic voltammograms were acquired at 30° C. The anode functioned as a working electrode during the measurements; the potential was controlled with a potentiostat/galvanostat (Solartron, model SI 1287), at a scan rate of 1 mV/sec. H$_2$ was fed to the fuel cell cathode compartment, the platinum/H$_2$ combination acted as a dynamic reference electrode (DHE) and a counter electrode. The H$_2$ flow rate was 100 scc/min, under a constant backpressure of 10 psig, humidified to 40° C. During CO adsorption the anode potential was held at 0.15 V vs. DHE. Initially, argon (Ar) was supplied to the fuel cell anode at 400 scc/min at a backpressure of 30 psig, and was humidified to 40° C. CO was adsorbed onto the surface from 0.1% CO in Ar (at 400 scc/min, backpressure 30 psig, humidified to 40° C.) for 30 min. The anode enclosure was then flushed for 10 min with Ar. The surface area for each anode was determined from the CO stripping peak, assuming a packing density equal to 1.0.

FIG. 11 illustrates the effect of anode catalyst composition on the cell polarization curve profile for the three catalysts tested: Pt, Pt/Ru and Pt/Pd for the exemplary fuel cell using a 5M formic acid fuel solution. The data illustrates that the exemplary catalysts Pt/Ru and Pt/Pd of the invention have an effect on the OCP of the exemplary fuel cell. The OCP was about 0.71 V with a platinum anode, was about 0.59 V with the Pt/Ru, and was about 0.91 V with the Pt/Pd catalyst. The data of FIG. 11 also show that with the Pt/Pd catalyst there is substantial current density output below 0.8 V, unlike that of both the Pt and Pt/Ru anode catalyst, for which current density output is not observed until the applied voltage is lower than 0.6 V. It is noteworthy that this exemplary formic acid fuel cell using the catalysts of the invention accordingly provided an OCP of about 0.2 V greater than that of DMFC under identical conditions. Larger current densities were observed for the reverse scan of the cell polarization curves for both Pt and Pt/Pd. For the Pt/Ru catalyst the forward and reverse scans are basically identical. The following currents are quoted from the reverse scan. At 0.5 V the current density output on the three anode catalysts were: Pt (33 mA/cm$^2$), Pt/Ru (38 mA/cm$^2$), and Pt/Pd (62 mA/Cm$^2$). Pt/Ru has the highest current density at the highest loadings (lower applied potentials). At 0.2 V the current density outputs were: Pt (187 mA/cm$^2$), Pt/Ru (346 mA/cm$^2$), and Pt/Pd (186 mA/cm$^2$). Note that current and power densities are expressed in units of cm$^2$ of anode for this third exemplary fuel cell.

Figure 11A:
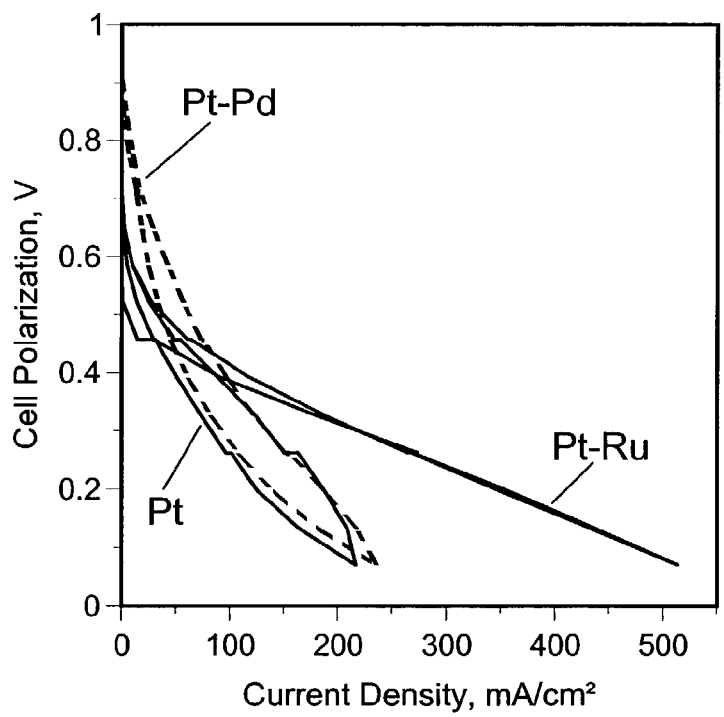
FIGS. 11(a) and 11(b) are data plots illustrating the performance of exemplary catalysts of the invention with 5M formic acid in a third exemplary fuel cell of the invention.
Figure 11B:
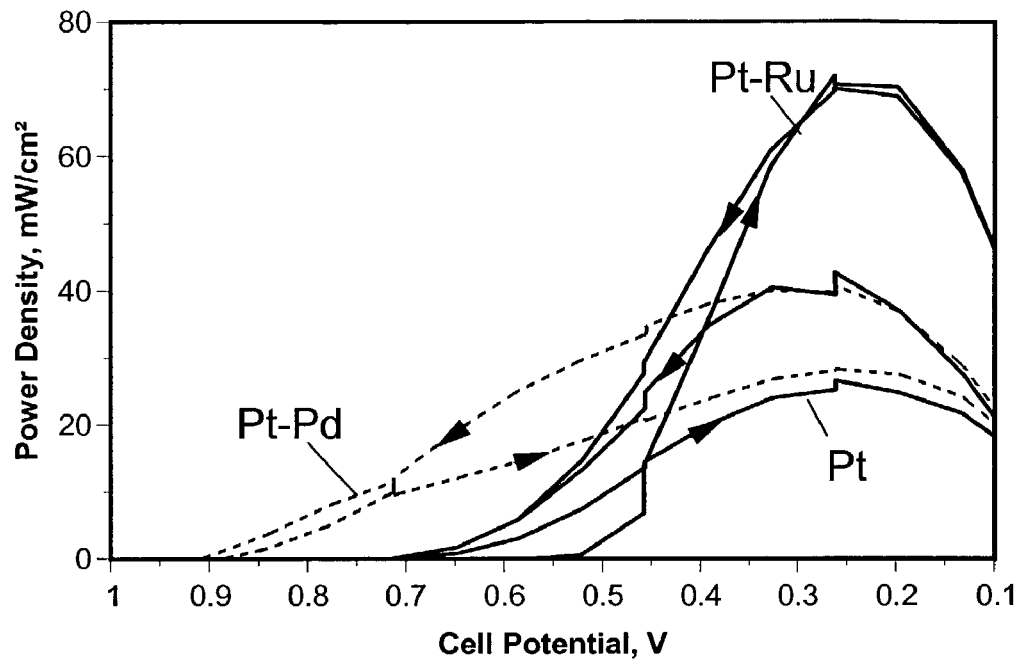

In FIG. 11(b), the data of FIG. 11(a) are further processed in terms of power density vs. the applied cell potential at room temperature (25° C.). The maximum power density attained on each of the three catalysts was: Pt—43 mW/cm$^2$ (0.26 V), Pt/Ru—70 mW/cm$^2$ (0.26 V), and Pt/Pd—41 mW/cm$^2$ (0.27 V). The exemplary Pt/Pd catalyst approached its maximum power density at the desired applied potential to run the fuel cell at cell potentials above (~0.5 V). Pt/Ru has the highest power density output, but only at low cell potential (0.27 V). It is again noteworthy to compare the performance of this exemplary fuel cell and catalysts of the invention to a DMFC under substantially identical conditions that measured a maximum power density of only about 12 mW/cm$^2$.

Figure 12:
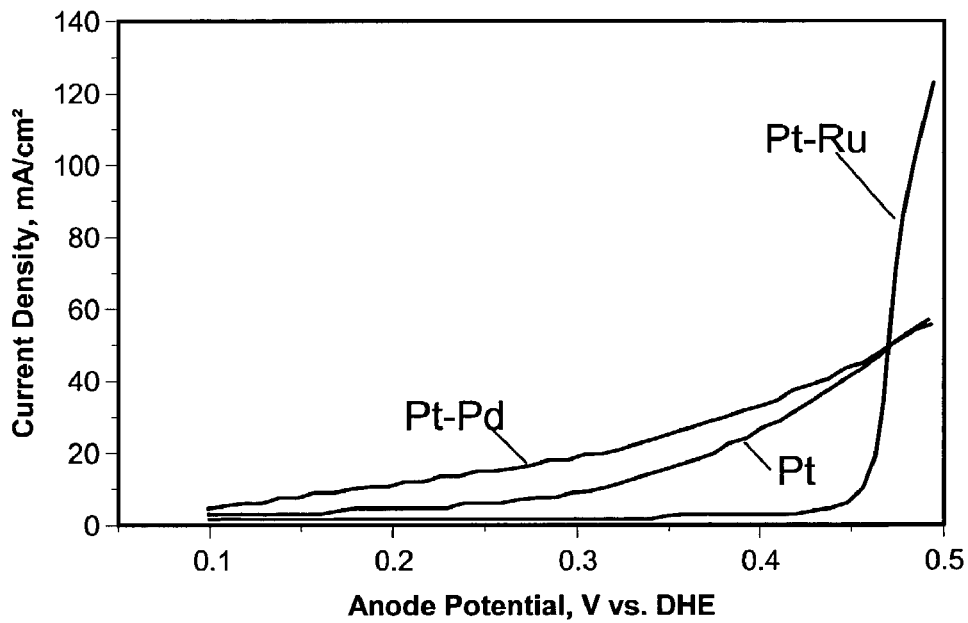
FIG. 12 is a data plot illustrating the performance of exemplary catalysts of the invention with 5M formic acid in the third exemplary fuel cell of the invention.

FIG. 12 shows anode polarization curves for the Pt anode catalyst and for the exemplary Pt/Pd and Pt/Ru catalysts of the invention with a 5 M formic acid fuel solution. The anode polarization plots differ from the cell polarization plots in that the potential of the fuel cell anode compartment is directly referenced against a dynamic reference electrode. This removes the effects of the cathode, thereby facilitating quantitative interpretation of the anode catalyst performance.

The anode polarization results generally mirror those found from the cell polarization curves in FIG. 11(a). There is greater than a 0.1 V difference in the on-set of formic acid oxidation on the exemplary Pt/Pd catalyst as compared to the Pt catalyst, partially accounting for the 0.2 V difference in the OCP. On the Pt/Ru anode catalyst there was substantially no current density at potentials below 0.4 V vs. DHE, followed by a sharp increase in activity above 0.45 V. Table 4 tabulates the current density at several anode potentials for the exemplary catalysts:

TABLE 4

Selected current densities of FIG. 12

| Anode Potential vs. DHE | Pt (mA/cm$^2$) | Pt/Ru (mA/cm$^2$) | Pt/Pd (mA/cm$^2$) |
|---|---|---|---|
| 0.2 V | 3 | 1.6 | 12 |
| 0.3 V | 7.6 | 1.6 | 18 |
| 0.4 V | 19.6 | 3 | 31.6 |
| 0.49 V | 43.6 | 111.36 | 48 |

At low potentials the Pt/Pd catalyst of the invention achieves higher currents than Pt or Pt/Ru catalysts.

Figure 13:
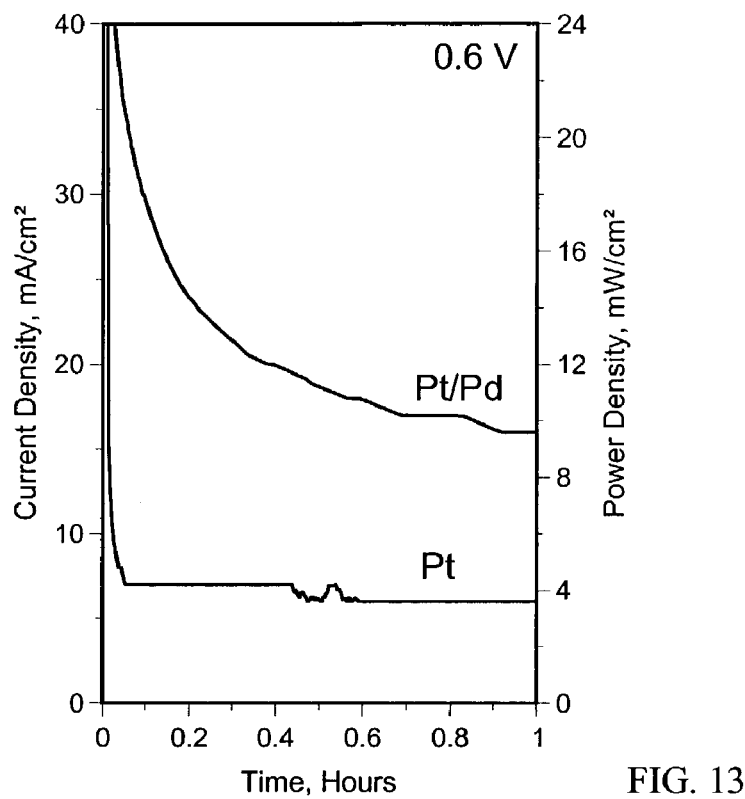
FIG. 13 is a data plot illustrating the time dependent performance of exemplary catalysts of the invention at 0.6 V.
Figure 14:
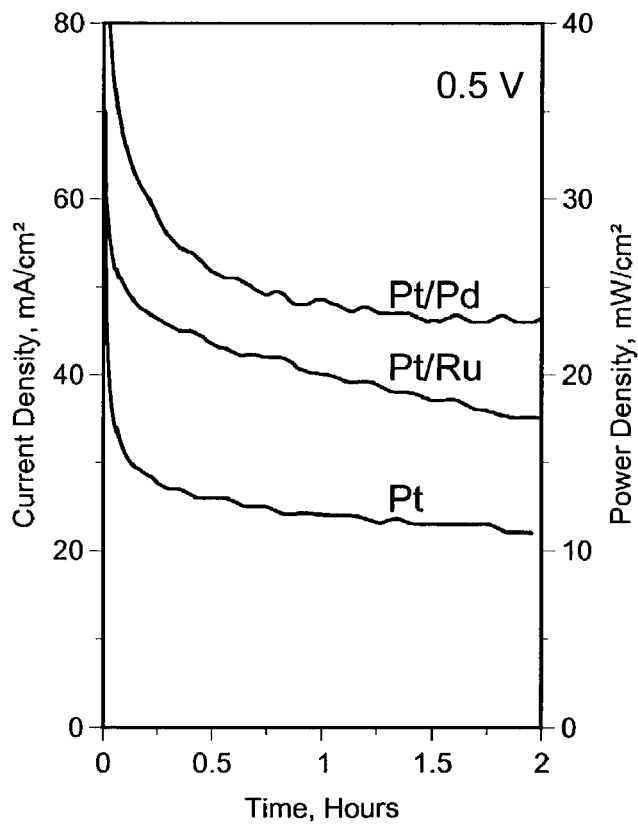
FIG. 14 is a data plot illustrating the time dependent performance of exemplary catalysts of the invention at 0.5 V.

It is noted with respect to FIG. 12 and Table 2 that the preferred Pt/Pd catalyst achieved an increase in activity of about four times over a Pt catalyst at a potential of about 0.2 V. While this is an appreciable and beneficial increase, it is significantly different from the approximate increase of eighty times measured when using the second exemplary fuel cell and discussed above with reference to FIG. 9. It is believed that the difference is due to a difference in the cathode configuration in the two experiments. In particular, it is believed that the second exemplary cell was anode limited (reaction rate limited by the anode reaction). Anode improvements were therefore directly reflected in the cell output. It is believed that this third exemplary cell, on the other hand, was cathode dominated (reaction rate limited by the cathode reaction), so improvements in the anode reaction were not as directly reflected in the cell output as they were in the second exemplary cell. Life tests were also performed using the exemplary formic acid fuel cell running with oxygen and using exemplary catalysts at applied cell potentials ranging from 0.6 V to 0.3 V. Results are summarized in FIGS. 12 through 15. In FIG. 13 the applied cell potential was 0.6 V. Only the Pt and Pt/Pd catalyst showed appreciable current densities at this applied potential. FIG. 14 illustrates life test data at a cell potential of 0.5 V. Both the Pt/Pd and the Pt/Ru catalysts of the invention led to superior performance over the Pt catalyst, with the Pt/Pd catalyst being most favorable at this potential. The final approximate steady state current densities after holding the cell potential at 0.5 V for 2 hours were: Pt—22.02 mA/cm$^2$ (10.30 mW/cm$^2$), Pt/Ru—35.14 mA/cm$^2$ (16.44 mW/cm$^2$), Pt/Pd—46.39 mA/cm$^2$ (21.71 mW/cm$^2$).

Figure 15:
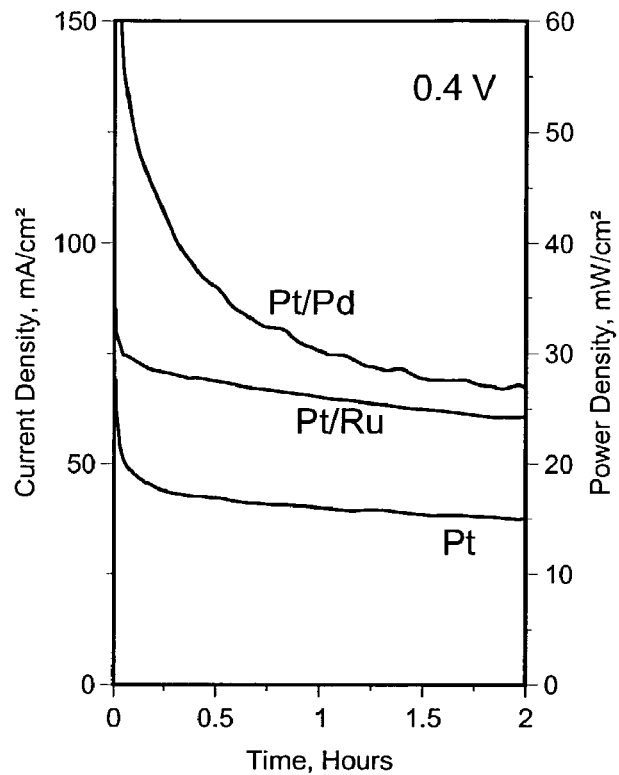
FIG. 15 is a data plot illustrating the time dependent performance of exemplary catalysts of the invention at 0.4 V; and, FIG. 16 is a data plot illustrating the time dependent performance of exemplary catalysts of the invention at 0.3 V.

FIG. 15 illustrates data from a life test run at a potential of 0.4 V. The Pt/Pd and the Pt/Ru catalysts were again superior to the Pt catalyst. The final approximate steady state current densities after holding the cell potential at 0.4 V for 2 hours were: Pt—37.44 mA/cm$^2$ (15.69 mW/cm$^2$), Pt/Ru—60.61 mA/cm$^2$ (25.40 mW/cm$^2$), and Pt/Pd—67.32 mA/cm$^2$ (28.24 mW/cm$^2$).

Figure 16:
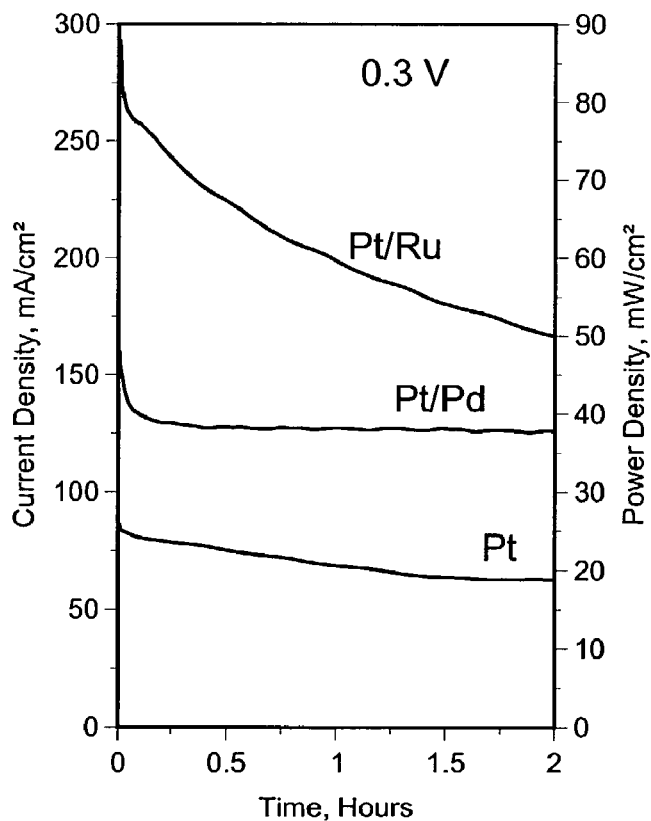

The final life test was obtained at a cell potential at 0.3 V, with results shown in FIG. 16. The catalyst of the invention again proved advantageous over Pt. At this applied potential the Pt/Ru catalyst was superior to the Pt/Pd. The final current densities after holding the cell potential at 0.3 V for 2 hours were: Pt—62.53 mA/cm$^2$ (19.36 mW/cm$^2$), Pt/Ru—166.72 mA/cm$^2$ (51.35 mW/cm$^2$), Pt/Pd—125.98 mA/cm$^2$ (39.14 mW/cm$^2$).

The performance results of the exemplary fuel cells show that the formic acid fuel solution and the catalysts of the invention show great promise for use in power applications. Many advantages are offered over DMFC's and other organic fuel cells of the prior art. These advantages may be of particular utility in mini- or micro-electronic device applications. For example, because a formic acid fuel cell running with a high fuel concentration is not subject to the water management issues of a DMFC, bulky and complicated water management systems that include pumps, sensors, and the like are not required. Thus a formic acid fuel cell of the invention may be advantageously provided in a more compact size than a DMFC. Also, the open cell voltage of a formic acid fuel cell is 0.2 V higher than that of a DMFC, so the power management is easier. A few exemplary applications for use of formic acid fuel cells of the invention include portable batteries, portable electronic devices such as sensors, communication devices, control devices, and the like. It will be appreciated that because of the relatively low potential of a single formic acid fuel cell, these and other applications may include a plurality of fuel cells such as the fuel cell 10 in series.

It is intended that the specific embodiments and configurations herein disclosed are illustrative of the preferred and best modes for practicing the invention, and should not be interpreted as limitations on the scope of the invention as defined by the appended claims.

What is claimed is:

1. A direct organic fuel cell comprising: a liquid fuel solution containing at least about 40% formic acid (by weight)

an anode contained in an anode enclosure, said liquid fuel solution contained in said anode enclosure;

a cathode electrically linked to said anode and contained in a cathode enclosure, an oxidizer contained in said cathode enclosure; and, a solid polymer electrolyte membrane interposed between said anode and said cathode, said anode and said cathode arranged on opposite surfaces of said solid polymer electrolyte membrane.

2. A direct organic fuel cell as defined by claim 1 wherein said solid polymer electroyte membrane comprises a perfluorosulfonic acid ionomer.

3. A direct organic fuel cell as defined by claim 1 wherein said solid polymer electrolyte membrane is substantially impervious to said liquid fuel solution.

4. A direct organic fuel cell as defined by claim 1 wherein said fuel solution contains less than about 95% (by weight) formic acid.

5. A direct organic fuel cell as defined by claim 1 wherein said fuel solution contains at least about 30% (by weight) water.

6. A direct organic fuel cell as defined by claim 1 wherein said oxidizer comprises dry air.

7. A direct organic fuel cell as defined by claim 1 wherein said anode is configured to promote reaction of said formic acid via a direct path that avoids formation of a CO intermediate.

8. A direct organic fuel cell as defined by claim 1 wherein the cell is operative to produce a power density of at least about 20 mW/cm$^2$ when operating at about 25° C.

9. A direct organic fuel cell as defined by claim 1 wherein the cell is operative to produce a power density of at least about 60 mW/cm$^2$ when operating at about 25° C.

10. A direct organic fuel cell as defined by claim 1 wherein the cell is operative to produce a current of at least about 5 mA/cm$^2$ at a voltage of about 0.7 V when operating at 25° C.

11. A direct organic fuel cell as defined by claim 1 wherein the cell is operative to produce a current of at least about 10 mA/cm$^2$ at a voltage of about 0.7 V when operating at about 25° C.

12. A direct organic fuel cell as defined by claim 1 wherein the cell is operative to produce a current of at least about 5 mA/cm$^2$ at a voltage of about 0.8 V when operating at about 25° C.

13. A direct organic fuel cell as defined by claim 1 wherein said anode enclosure has at least one $CO_2$ vent passage that is generally tubular shaped, is made of a hydrophobic material, has a length to diameter ratio of at least about 0.5, and has a diameter of less than about 1/32 in.

14. A direct organic fuel cell as defined by claim 1 and further comprising an anode catalyst containing metal nanoparticles having a coating of a second metal on their surface.

15. A direct organic fuel cell as defined by claim 14, wherein said coating comprises discrete islands on said metal nanoparticles.

16. A direct organic fuel cell as defined by claim 14 wherein said metal nanoparticles is at least one of Pt, Pd, Ru, Re, Ir, Au, Ag, Go, Fe, Ni Mn, wherein said coating is at least one of Pt, Pd, Ru.

17. A direct organic fuel cell as defined by claim 14, wherein said metal nanoparticles are Pt, and said coating is at least one of Pd and Ru.

18. A direct organic fuel cell as defined by claim 17 wherein said anode catalyst has a loading of between about 0.5 and about 12 gm/cm$^2$.

19. A direct organic fuel cell as defined by claim 14, wherein said coating is no more than about 3 nm thick.

20. A direct organic fuel cell as defined by claim 14 wherein said anode catalyst has a surface composition different from its bulk composition.

21. A direct organic fuel cell as defined by claim 1 wherein said anode is configured to promote the dehydrogenation of said formic acid to $CO_2$ and H$^+$ without the formation of a CO intermediate.

22. A direct formic acid fuel cell comprising: a solid polymer electrolyte membrane having opposite first and second surfaces;

an anode arranged on said membrane first surface and contained in an anode enclosure, a formic acid fuel solution contained in said anode enclosure, said formic acid fuel solution having a formic acid concentration of between about 40% and about 65% (by weight) and a water concentration of at least about 30% (by weight), said anode including a catalyst operative to promote the direct dehydrogenation of said formic acid fuel solution without the formation of a CO intermediate;

a cathode contained in a cathode enclosure and arranged on said second surface of said membrane, $O_2$ contained in said cathode enclosure; and, an electrical linkage connecting said anode to said cathode.

23. A direct organic fuel cell comprising: a liquid fuel solution containing between about 40% and about 65% (by weight) formic acid;

an anode contained in an anode enclosure, said liquid fuel solution contained in said anode enclosure;

a cathode electrically linked to said anode and contained in a cathode enclosure, an oxidizer contained in said cathode enclosure; and, a solid polymer electrolyte membrane separating said anode from said cathode.

24. A direct organic fuel cell as defined by claim 23, wherein said solid polymer electrolyte membrane comprises a solid polymer perfluorosulfonic acid ionomer proton exchange membrane, said anode and said cathode arranged on opposite sides of said solid polymer proton exchange membrane.

25. A direct organic fuel cell as defined by claim 23 wherein said solid polymer electrolyte membrane is substantially impervious to said liquid fuel solution.

26. A direct organic fuel cell as defined by claim 23 wherein said liquid fuel solution contains at least about 30% (by weight) water.

27. A direct organic fuel cell as defined by claim 23 wherein said anode is configured to promote reaction of said formic acid via a direct path that avoids formation of a CO intermediate.

28. A direct organic fuel cell as defined by claim 23 wherein the cell is operative to produce a power density of at least about 60 mW/cm$^2$ when operating at about 25° C.

29. A direct organic fuel cell as defined by claim 23 wherein the cell is operative to produce a current of at least about 10 mA/cm$^2$ at a voltage of about 0.7 V when operating at about 25° C.

30. A direct organic fuel cell as defined by claim 23 and further including an anode catalyst containing metal nanoparticles having a coating of a second metal on their surface.

31. A direct organic fuel cell as defined by claim 30, wherein said coating comprises discrete islands on said metal nanoparticles.

32. A direct organic fuel cell as defined by claim 31, wherein said metal nanoparticles are Pt and said coating is one of Pd or Ru.

33. A direct organic fuel cell as defined by claim 32 wherein said anode catalyst has a loading of between about 0.5 and about 12 gm/cm$^2$.

34. A direct organic fuel cell as defined by claim 31 wherein said metal nanoparticles are at least one of Pt, Pd, Ru, Re, Ir, Au, Ag, Co, Fe, Ni, or Mn, and wherein said coating is at least one of Pt, Pd, or Ru.

35. A direct organic fuel cell as defined by claim 30, wherein said coating is no more than about 3 nm thick.

36. A direct organic fuel cell as defined by claim 23 wherein said anode is configured to promote the dehydrogenation of said formic acid to $CO^2$ and $H^+$ without the formation of a CO intermediate.

37. A direct organic fuel cell comprising: a liquid fuel solution containing between about 50% and about 70% (by weight) formic acid;

an anode contained in an anode enclosure, said liquid fuel solution contained in said anode enclosure;

a cathode electrically linked to said anode and contained in a cathode enclosure, an oxidizer that comprises humidified air contained in said cathode enclosure; and, a solid polymer electrolyte membrane separating said anode from said cathode.

* * * * *

UNITED STATES PATENT AND TRADEMARK OFFICE
CERTIFICATE OF CORRECTION

| | |
|---|---|
| PATENT NO. | : 7,132,188 B2 |
| APPLICATION NO. | : 10/407385 |
| DATED | : November 7, 2006 |
| INVENTOR(S) | : Masel et al. |

It is certified that error appears in the above-identified patent and that said Letters Patent is hereby corrected as shown below:

On title page

Item 56 References Cited, U.S. Patent Documents, page 2, column 1, after "5,393,619 A 2/1995 Mayer et al. … 429/152", please insert --5,599,637 A 2/1997 Surampudi et al. 429/27--. (PTO Form 1449, submitted March 24, 2004 and October 14, 2004, Acknowledged March 24, 2005)

Item 56 References Cited, Other Publications, page 3, column 2, after " R.R. Adzic, A.V. Tripkovic and N.M. Markovic, "Structural Effects in Electocatalysis, Oxidation of Formic Acid and Oxygen Reduction on Single-Crystal Electrodes and the effects of Foreign Metal Adatoms," Electroanal. Chem. 150 .79-88, (1983).", please insert --Guo-Qiang Lu, Alechia Crown, and Andrzej Wieckowski; "Formic Acid Decomposition on Polycrystalline Platinum and Palladized Platinum Electrodes", J. Phys. Chem. B 1999, 103, pp. 9700-9711--. (PTO Form 1449, submitted August 6, 2003, Acknowledged March 23, 2004)

Item 56 References Cited, Other Publications, page 3, column 1, after "Rhee, Y. et al.; "Crossover of formic acid through Nation® membranes", *Journal of Power Sources*, 2003, pp. 35-38." please delete "Pro'kin, S. et al.;", and insert --Pron'kin, S. et al.;-- therefor. (PTO Form 1449, submitted October 14, 2004, Acknowledged March 24, 2005)

UNITED STATES PATENT AND TRADEMARK OFFICE
CERTIFICATE OF CORRECTION

PATENT NO. : 7,132,188 B2
APPLICATION NO. : 10/407385
DATED : November 7, 2006
INVENTOR(S) : Masel et al.

It is certified that error appears in the above-identified patent and that said Letters Patent is hereby corrected as shown below:

Column 8, line 58, after "acids in", please delete "Tables 1 and 1" and insert --Tables 1 and 2-- therefor.

Column, 19, line 60, after "Fe,", please delete " Ni Mn," and insert --Ni, and Mn-- therefor.

Column 19, line 61, after "least one of Pt,", please delete "Pd, Ru." and insert --Pd, and Ru.-- therefor.

Signed and Sealed this

Second Day of October, 2007

JON W. DUDAS
*Director of the United States Patent and Trademark Office*